US006329994B1

(12) United States Patent
Gever et al.

(10) Patent No.: US 6,329,994 B1
(45) Date of Patent: Dec. 11, 2001

(54) PROGRAMMABLE COMPUTER GRAPHIC OBJECTS

(75) Inventors: Eyal Gever, Tel Aviv; Nir Hermoni, Ramat Gan; Orit Bergman, Tel Aviv; Gil Tayar, Giv'atayim; Eilon Reshef, Tel Aviv; Doron Gill, Giv'atayim; Addy Feuerstein, Tel Aviv; Yaron Caneti, Tel Aviv; Roy Oppenheim, Tel Aviv; Eran Etam, Tel Aviv; Zohar Shpeizer, Tel Aviv; Yoav Borer, Tel Aviv; Eyal Livine, K'far Saba; Ruth Kikin, Tel Aviv; Oren Zuckerman, Ramat Gan; Ron Kaas, Moshav Ben-Shemen, all of (IL)

(73) Assignee: Zapa Digital Arts Ltd., Tel Aviv (IL)

( * ) Notice: Subject to any disclaimer, the term of this patent is extended or adjusted under 35 U.S.C. 154(b) by 0 days.

(21) Appl. No.: 08/819,607

(22) Filed: Mar. 14, 1997

Related U.S. Application Data

(60) Provisional application No. 60/013,624, filed on Mar. 15, 1996.

(51) Int. Cl.[7] .................................................. G06T 15/70
(52) U.S. Cl. ........................... 345/473; 345/474; 345/452; 345/500; 345/118
(58) Field of Search .................................... 345/473, 500, 345/452, 474, 118; 364/419

(56) References Cited

U.S. PATENT DOCUMENTS

| | | | |
|---|---|---|---|
| 3,510,210 | 5/1970 | Haney | 352/39 |
| 3,585,628 | 6/1971 | Harrison, III et al. | 340/324.8 |
| 3,700,792 | 10/1972 | Harrison, III et al. | 178/6.8 |
| 3,747,087 | 7/1973 | Harrison, III et al. | 340/324 |
| 3,792,243 | 2/1974 | Appel et al. | 235/151 |

(List continued on next page.)

OTHER PUBLICATIONS

Jung et al. "Animated Human Agents with Motion Planning Capability for 3D–Space Postural Goals", Journal of Visualization and Computer Animated, Oct. 1994, vol. 5, pp. 225–246.

Kokkevis et al. "Autonomous Animation an Control of Fou Legged Animals", Proceedings Of Graphics Interface 95, May 17, 1995, pp. 10–17.

Badler, N.I. "Human Task Animation", NCGA 89 Conference Proceedings Of The 10th Annual and Exposition Dedicated To Computer Graphics, Apr. 17, 1989, vol. 1, pp. 343–354.

Maiocchi, R. "A Knowledge–Based Approach to the Synthesis of Human Motion", Modeling In Computer Graphics (Proceedings Of The IFIP WG 5.10 Working Conference). Apr. 8, 1991, pp. 157–168.

Badler, N.I. "Artificial Intelligence, Natural Language, and Simulation for Human Animation", Proceedings Of Computer Animation 89, Jun. 22, 1989, pp. 19–31.

"Simulating Humans", Badler et al., Department of Computer and Information Science University of Pensylvania, Chapter 1, pp. 2–3, 1993.*

Primary Examiner—Mark R. Powell
Assistant Examiner—Kimbinh T. Nguyen
(74) Attorney, Agent, or Firm—Ladas & Parry

(57) ABSTRACT

A method for producing an animation sequence on a graphic display driven by a computer, including defining an object that includes a geometrical description of an animated character and characteristics of social behavior of the character and animating an image of the character responsive to the characteristics. The character is programmed with a predetermined response, such as a rule governing motion of the character, to a sensitivity condition occurring externally to the object. The geometrical description of the object includes a geometrical skeleton characterized by a hierarchy of sub-objects connected by joints, the rule governing motion defines motions of the joints.

9 Claims, 26 Drawing Sheets

U.S. PATENT DOCUMENTS

| | | | |
|---|---|---|---|
| 4,053,740 | 10/1977 | Rosenthal | 364/705 |
| 4,117,469 | 9/1978 | Lebine | 340/324 |
| 4,558,438 | 12/1985 | Jones et al. | 367/71 |
| 4,600,919 | 7/1986 | Stern | 340/725 |
| 4,686,622 | 8/1987 | Hyatt | 364/200 |
| 4,752,836 | 6/1988 | Blanton | 358/342 |
| 4,766,423 | 8/1988 | Ono et al. | 340/709 |
| 4,797,836 | 1/1989 | Witek et al. | 364/518 |
| 4,805,121 | 2/1989 | Scott et al. | 364/522 |
| 4,807,158 | 2/1989 | Blanton et al. | 364/521 |
| 4,821,220 | 4/1989 | Duisberg | 364/578 |
| 4,827,404 | 5/1989 | Barstow et al. | 364/200 |
| 4,884,199 | 11/1989 | Boothroyd | 364/408 |
| 4,884,972 | 12/1989 | Gasper | 434/185 |
| 4,893,256 | 1/1990 | Rutherfoord et al. | 364/518 |
| 4,901,223 | 2/1990 | Rhyne | 364/200 |
| 4,905,168 | 2/1990 | McCarthy et al. | 364/521 |
| 4,951,229 | 8/1990 | Dinicola et al. | 364/521 |
| 4,953,107 | 8/1990 | Hedley et al. | 364/522 |
| 4,965,752 | 10/1990 | Keith | 364/522 |
| 4,965,753 | 10/1990 | Kraemer | 364/522 |
| 5,007,005 | 4/1991 | Hatakeyama et al. | 364/521 |
| 5,025,394 | 6/1991 | Parke | 364/518 |
| 5,025,400 | 6/1991 | Cook et al. | 364/522 |
| 5,046,026 | 9/1991 | Tolomei | 364/521 |
| 5,050,102 | 9/1991 | Sun et al. | 364/521 |
| 5,093,907 | 3/1992 | Hwong et al. | 395/152 |
| 5,113,493 | 5/1992 | Crosby | 395/152 |
| 5,185,665 | 2/1993 | Okura et al. | 358/183 |
| 5,214,758 | 5/1993 | Ohba et al. | 395/164 |
| 5,235,679 | 8/1993 | Yoshizawa et al. | 395/156 |
| 5,237,648 | 8/1993 | Mills et al. | 395/133 |
| 5,239,624 | 8/1993 | Cook et al. | 395/125 |
| 5,241,671 | 8/1993 | Reed et al. | 395/600 |
| 5,261,041 * | 11/1993 | Susman | 345/452 |
| 5,261,820 | 11/1993 | Slye et al. | 434/43 |
| 5,267,154 | 11/1993 | Takeuchi et al. | 364/419.2 |
| 5,287,446 | 2/1994 | Williams et al. | 395/152 |
| 5,297,057 | 3/1994 | Kramer et al. | 364/512 |
| 5,315,692 | 5/1994 | Hansen et al. | 395/119 |
| 5,317,685 | 5/1994 | Morimura et al. | 395/152 |
| 5,322,441 | 6/1994 | Lewis et al. | 434/307 |
| 5,325,480 | 6/1994 | Rice | 395/152 |
| 5,347,306 | 9/1994 | Nitta | 348/15 |
| 5,353,392 | 10/1994 | Lequet et al. | 395/135 |
| 5,356,156 | 10/1994 | Suzuki et al. | 273/437 |
| 5,359,703 | 10/1994 | Robertson et al. | 395/119 |
| 5,367,454 * | 11/1994 | Kawamoto et al. | 345/422 |
| 5,377,319 | 12/1994 | Kitahara et al. | 395/161 |
| 5,384,667 | 1/1995 | Beckwith | 360/33.1 |
| 5,384,908 | 1/1995 | MacKinlay et al. | 395/152 |
| 5,404,437 * | 4/1995 | Nguyen | 345/452 |
| 5,411,272 | 5/1995 | Naka et al. | 273/437 |
| 5,416,899 | 5/1995 | Poggio et al. | 395/152 |
| 5,422,809 | 6/1995 | Griffin et al. | 364/407 |
| 5,425,139 | 6/1995 | Williams et al. | 395/152 |
| 5,426,726 | 6/1995 | Horiuchi et al. | 395/150 |
| 5,428,723 | 6/1995 | Ainscow et al. | 395/135 |
| 5,428,731 | 6/1995 | Powers, III et al. | 395/154 |
| 5,428,774 | 6/1995 | Takahashi et al. | 395/600 |
| 5,448,694 | 9/1995 | Wada et al. | 395/152 |
| 5,450,540 | 9/1995 | Spohrer et al. | 395/155 |
| 5,455,902 | 10/1995 | Ellson et al. | 395/152 |
| 5,459,830 | 10/1995 | Ohba et al. | 395/152 |
| 5,463,725 | 10/1995 | Henckel et al. | 395/155 |
| 5,475,811 | 12/1995 | Newmann et al. | 395/155 |
| 5,479,602 | 12/1995 | Baecker et al. | 395/155 |
| 5,483,630 | 1/1996 | Unuma et al. | 395/152 |
| 5,485,600 * | 1/1996 | Joseph et al. | 345/500 |
| 5,488,658 | 1/1996 | Hirashima | 380/14 |
| 5,490,239 | 2/1996 | Myers | 395/129 |
| 5,493,726 | 2/1996 | Mori | 395/161 |
| 5,495,568 | 2/1996 | Beabin | 395/161 |
| 5,502,807 | 3/1996 | Beachy | 395/152 |
| 5,504,849 | 4/1996 | Brusewitz | 395/152 |
| 5,506,949 | 4/1996 | Perrin | 395/152 |
| 5,511,158 | 4/1996 | Sims | 395/140 |
| 5,513,303 | 4/1996 | Robertson et al. | 395/119 |
| 5,513,306 | 4/1996 | Mills et al. | 395/148 |
| 5,513,307 | 4/1996 | Naka t al. | 395/152 |
| 5,515,489 | 5/1996 | Yaeger | 395/152 |
| 5,517,663 | 5/1996 | Kahn | 395/800 |
| 5,519,825 | 5/1996 | Naughton et al. | 395/152 |
| 5,519,826 | 5/1996 | Harper et al. | 395/152 |
| 5,524,195 | 6/1996 | Clanton, III et al. | 395/155 |
| 5,524,197 | 6/1996 | Uya et al. | 395/157 |
| 5,526,479 | 6/1996 | Barstow et al. | 395/152 |
| 5,533,181 | 7/1996 | Bergsneider | 395/152 |
| 5,533,903 | 7/1996 | Kennedy | 434/307 |
| 5,537,641 | 7/1996 | Da Vitoria Lobo et al. | 395/119 |
| 5,544,295 | 8/1996 | Capps et al. | 395/152 |
| 5,546,518 | 8/1996 | Blossom et al. | 395/152 |
| 5,548,693 | 8/1996 | Shinya | 395/152 |
| 5,557,175 | 9/1996 | Wood | 315/200 |
| 5,559,941 | 9/1996 | Brechner | 395/152 |
| 5,563,988 | 10/1996 | Maes et al. | 395/121 |
| 5,564,000 | 10/1996 | Halpern | 395/152 |
| 5,566,290 | 10/1996 | Silverbrook | 395/152 |
| 5,566,294 | 10/1996 | Kogima et al. | 395/159 |
| 5,568,602 | 10/1996 | Callahan et al. | 395/154 |
| 5,570,461 | 10/1996 | Yokomizo | 395/135 |
| 5,572,646 | 11/1996 | Kawai et al. | 395/501 |
| 5,577,185 | 11/1996 | Tunnell et al. | 395/173 |
| 5,583,979 | 12/1996 | Sonohara et al. | 395/173 |
| 5,583,980 | 12/1996 | Anderson | 395/173 |
| 5,590,261 | 12/1996 | Szlaroff et al. | 395/173 |
| 5,793,382 * | 8/1998 | Yerazunis et al. | 345/474 |
| 5,867,175 * | 2/1999 | Katzenberger et al. | 345/473 |

* cited by examiner

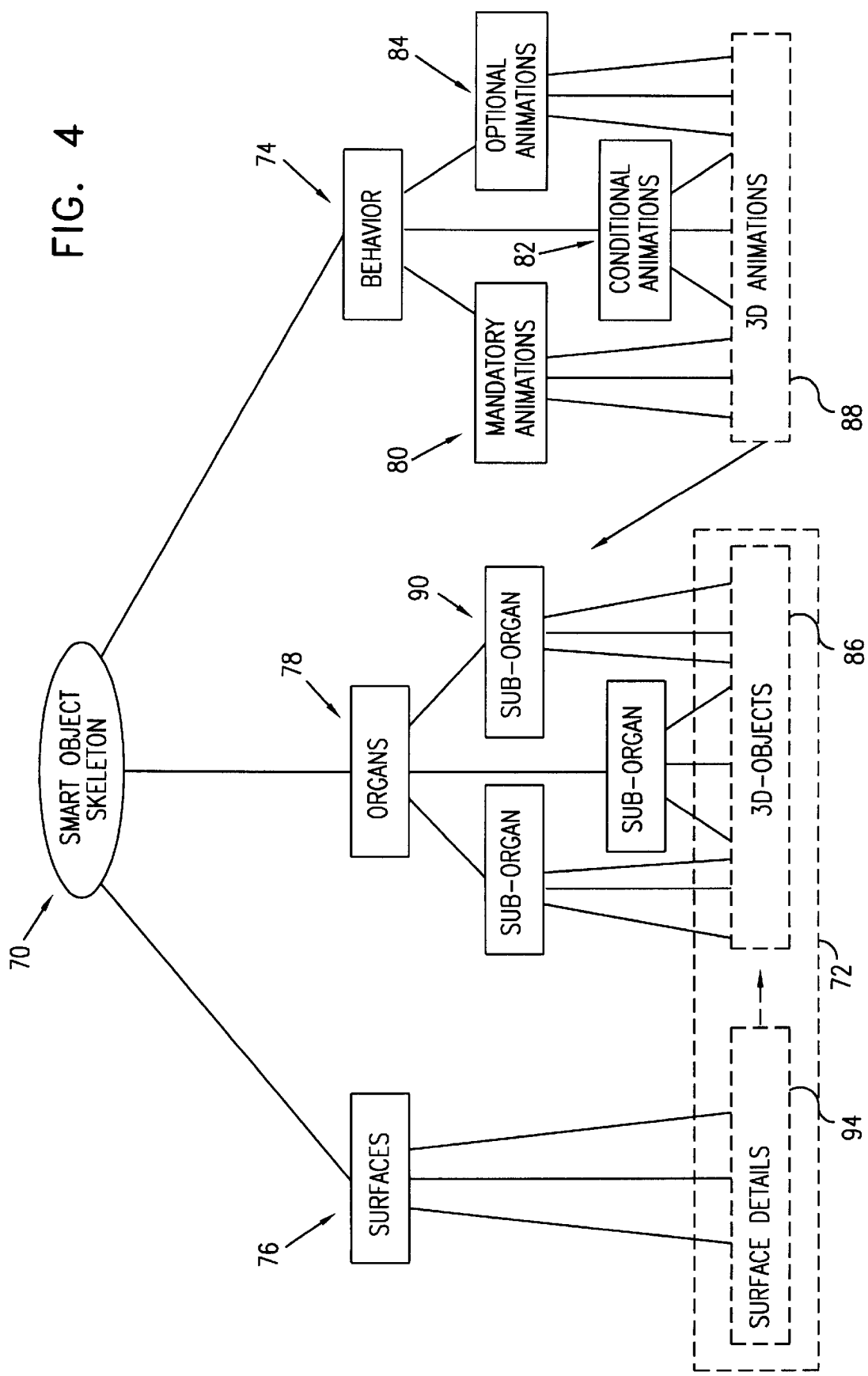

PROGRAMMABLE COMPUTER GRAPHIC OBJECTS

This application claims the benefit of U.S. Provisional Patent Application Ser. No. 60/013,624, filed Mar. 15, 1996, which is incorporated herein by reference.

FIELD OF THE INVENTION

The present invention relates generally to computer animation, and specifically to interactive generation and manipulation of moving computer graphic objects.

BACKGROUND OF THE INVENTION

Computer animation systems and methods are well known in the art, serving a wide range of applications in which a computer is used to generate and/or manipulate moving images. In recent years, the rapid advance in computing speed and reduction in cost of personal computers (PC's) has made computer animation widely accessible. Because of the relatively heavy computation load associated with three-dimensional (3D) image rendering, most of the animation programs for PC's have been able to offer only 2D imaging or very limited 3D effects. Similarly, although 2D animations are now commonly conveyed from one computer to another over the Internet and other network systems, the bandwidth limitations of the Internet have, at least until recently, made it generally impractical to convey 3D animations.

Software tools and languages are available to assist programmers in creating 3D animations. For example, "LightWave 5.0," produced by Newtek, Inc., of Topeka, Kans., is a software package that enables users to define and manipulate geometrical models and animations of 3D graphic objects within a computer animation environment. Such objects are defined as skeletons, or hierarchies of geometrical shapes that are connected together at joints. These objects may further include methods, or program routines, that define the basic movements of the joints. Thus, an animated humanoid character may be defined by a skeleton including torso, head, arms, legs, hands, feet, and other features, with interlinking joints and methods that describe walking, running, hand-waving and other actions. Motion of the character along a desired path in a 3D virtual space may be engendered by indicating positions of the object in two or more key frames, whereupon the intermediate positions of the object between the key frames are interpolated, using the appropriate methods belonging to the object.

Based on the 3D geometrical definition of the object, an image of the animated character is rendered on a computer screen. Various software packages are available for 3D rendering, for example, "RenderWare V2.0," produced by Criterion Software Ltd. of Surrey, UK. The rendering software typically takes into account the effects of light, shade, color, surface textures, perspective and other visual elements, to create a convincingly "3D" image on the flat computer screen. Generally, multiple 3D objects are rendered together, along with a suitable background, to form a single image on screen.

U.S. Pat. No. 5,261,041, to Susman, which is incorporated herein by reference, describes a computer-controlled animation system based on manipulation of animated objects. Each object includes state data and methods, or functions, defining the behavior of the object. The objects also have associated affect volumes and affect agents, or methods, that determine how they will interact with each other as an animation sequence progresses. The animation sequence is governed by a set of rules, graphs or scripts. The behavior of the objects in the sequence is modeled and rendered on a display screen.

U.S. Pat. No. 5,483,630, to Unuma et al., which is incorporated herein by reference, describes a method for representing motion of multiple-jointed objects, for use in computer animation. The bending angles of the joints of a multiple-jointed object are represented by functions expressed independently of the length between the joints. Based on the functions, contour data are produced representing the motion of the joints, which data are used in rendering the objects in computer animation sequences. Parameters of the functions can be adjusted so that the motion of the joints has a desired character, for example, running or walking motion, or motion having a manner intended to give a sense of an emotional quality.

U.S. Pat. No. 5,267,154, to Takeuchi et al., which is incorporated herein by reference, describes a system for producing "biological images," i.e., animated computer images of human and animal characters. Images are synthesized by combining data from several databases in which shapes, motions and external features and textures are stored. The system is used to produce a variety of 3D animated characters, which take part in computer-animated image sequences.

U.S. Pat. No. 5,577,185, to Tunnell et al., which is incorporated herein by reference, describes a method and apparatus for creating computer-animated puzzles. The puzzles are made up of animated objects, such as structural members and characters, displayed on a computer screen. Each of the objects has a set of programmed physical and behavioral attributes, as a result of which the objects appear on screen to be aware of and to react to one another. They are programmed to appear to obey physical laws, such as the laws of gravity and motion, and to exhibit natural tendencies, such as hunger and affinity. The puzzles are created by selecting the desired objects from a menu displayed on the computer screen.

Computer-animated images may be overlaid on other images and/or windows on a computer display screen. For example, U.S. Pat. No. 5,546,518, to Blossom et al., which is incorporated herein by reference, describes a system and method for composing a display frame of multiple, layered graphic "sprites." A sprite is a graphic image that forms a part or a region of an overall computer display screen. The sprites are overlaid one above the other. The sprites preferably include transparent pixels in certain areas, through which underlying graphics can be seen. The system of sprites is used to combine video and/or animated images together with still images on a single screen.

Recently, tools have begun to emerge for sending and receiving 3D animations over computer networks, such as the Internet, for example, Version 2.0 of the Virtual Reality Modeling Language (VRML 2.0), as described in "Moving Worlds," at http://vrml.sgi.com (Silicon Graphics Inc.), and incorporated herein by reference. VRML 2.0 was developed by a group of companies to provide a language for creating animations in a compact form that is convenient for transmission over the Internet, and for viewing the animations at the receiving end. VRML 2.0 includes conventions for a user at a source computer to define and organize elements of an interactive animated image, such as 3D object geometries, surface textures, motion and action scripts and to encapsulate these elements for Internet transmission. When the encapsulated elements are received by a target computer having VRML-compatible network browser software, the animated image created at the source computer is rendered on the target computer screen.

Viewers of 3D animations generally require user interface software to enable them to observe and manipulate the animated images. Such software is known in the art, for example, "CosmoPlayer," a VRML 2.0-compatible network browser, available from Silicon Graphics at http://vrml.sgi.com, as described above. CosmoPlayer operates as a "plug-in" to an Internet web browser, such as Netscape "Navigator" or Microsoft Internet Explorer." CosmoPlayer enables a user to view animations of 3D objects and to vary a point of view from which the animations are rendered to the user's computer screen by means of "free navigation" in a virtual 3D space. It will be appreciated that because the computer screen and user controls are essentially two-dimensional, "free navigation" is generally difficult for a non-expert user to master.

Computer-animated images may likewise be used to create an animated electronic meeting place, as described, for example, in U.S. Pat. No. 5,347,306, to Nitta, which is incorporated herein by reference. Each participant in a meeting has a terminal with prestored local animation graphics. The terminals are connected to a network, over which the meeting takes place. The meeting is shown on the display of each of the terminals using real-time animated 3D graphic characters and sound, representing the participants' motions, expressions and speech. Each of the participants is represented in the animation by one of the animated characters, having a persona which may be chosen by the participant. The characters in the animated meeting are driven by sensors that sense the movement and speech of the actual participants. The participants may also use view controls, such as a joystick, to zoom or to alter their viewing perspectives.

SUMMARY OF THE INVENTION

It is an object of the present invention to provide improved methods and apparatus for producing an animated image of an object, preferably a three-dimensional (3D) object, in a computer graphic display.

Unlike computer animations known in the art, animated objects in accordance with preferred embodiments of the present invention are substantially autonomous, i.e., the objects include rules, preferably in the form of a scripting language, which are sufficient to determine how they will behave in a given scene. In some aspects of the present invention, the objects correspond to humanoid characters, and the rules define social behavior of the characters in the scene, imparting human personality types to the animated characters. Furthermore, the animated objects, including the rules, are modular, in that behaviors may be transferred freely among objects of a common type. The methods of implementation and the implications of this autonomy and behavioral modularity of animated objects are described below.

It is an object of some aspects of the present invention to enable the image of the 3D object to be rendered as an overlay on a display generated by another software application, not necessarily related to the Scene Manager program, for example, an Internet Web Browser.

It is a further object of some aspects of the present invention to provide methods and apparatus for representing an object by means of a modular set of parameters and/or data, which is transferred over a computer network from a source computer to a destination computer, whereupon an image of the object is produced in an animated computer graphic display at the destination computer.

Preferably, the set of parameters and/or data is encapsulated and transferred in the form of an electronic mail message.

It is another object of some aspects of the present invention to provide user interface methods and apparatus, for use in interactively viewing and controlling computer animations.

It is an additional object of some aspects of the present invention to provide visual methods and apparatus enabling a user to search conveniently through a database or library of computer graphic objects, useful particularly in creating computer animations.

In preferred embodiments of the present invention, computer animation apparatus comprises an animation generator, typically a computer, for example, a personal computer (PC). The computer has an associated video graphic display, memory and user input devices, such as a keyboard, mouse and/or joystick, as are known in the art. Preferably, the computer also includes a network connection, for example, a modem through which the computer is connected to the Internet. The computer is programmed to produce an animated graphic sequence, using methods described below, and the sequence is shown on the display.

In preferred embodiments of the present invention, the animated graphic sequence is produced using 3D Smart Objects, as described herein. In the context of the present patent application, the term "object" is used to refer to a modular, graphic and/or mathematical description of an image element (generally a representation of a physical object, which may be naturalistic or fanciful), whose representation may appear in the animation sequence. The term "Smart Object" as used herein, in accordance with preferred embodiments of the present invention, refers to an object comprising both the graphic/mathematical description of an image element and embedded ancillary information about the element. Such ancillary information preferably comprises procedures, typically in the form of scripts, which describe attributes, motion and behavior of the element, as described hereinbelow, and may also include other information, such as textual reference data. "3D Smart Objects" include attributes of shape and motion that are used in rendering 3D images of the corresponding image elements.

Each Smart Object preferably comprises a set of sub-objects in a predetermined hierarchy, which defines the relationships between the sub-objects. The hierarchy preferably includes a "skeleton," defining the parts of the body of the image element, the joints connecting those parts, and the motions of the parts in animation. Other components of the Smart Object describe attributes such as sound and rules governing behavior of the Smart Object. The hierarchical structure of Smart Objects allows a user to exchange organs and sub-organs, as well as behaviors, between Smart Objects that share a common hierarchy. New Smart Objects may be created by inheritance of attributes from an existing Smart Object.

Image elements or characters that correspond to Smart Objects appear in a computer animation sequence to move and function autonomously, based on the behavioral rules embedded in the Smart Objects. For example, a sub-object of a Smart Object preferably specifies an "idle" behavior, i.e., a motion or other action that the corresponding image element will undertake when the Smart Object has received no other program instructions for a predetermined period of time. Preferably, the sub-objects in the hierarchy are chosen to impart a desired "personality" to the Smart Object, wherein the personality comprises a suitable combination of physical appearance, facial expressions, characteristic movement and gestures, voice and other attributes that a user will associate with a certain personality type. Further preferably, the user may design a Smart Object, using methods described below, to represent a particular character.

Preferably, Smart Objects also include sub-objects that define their response to sensitivity conditions that may arise externally to the Smart Object itself, such as the presence of other objects in the computer display. Such sub-objects may specify an interaction or response of one Smart Object to another Smart Object, for example, attraction of one Smart Object having a male persona to another Smart Object having a female persona. Additionally or alternatively, sub-objects may specify the response of the Smart Object to other image elements shown in the computer display, for example, to static or moving graphic icons generated by other software applications, which may or may not include animation and which do not themselves make use of Smart Objects. Furthermore, Smart Objects may include sub-objects that have learning capabilities, as are known in the art, whereby the behavior of the Smart Object is modified adaptively in response to inputs from the computer-animated environment.

A Smart Object, as described herein, includes data, such as geometrical parameters and scripts, which are read by a program that generates an animated image sequence including the image element corresponding to the Smart Object. In the context of the present patent application and in the claims, such a program is referred to as a Scene Manager. The Scene Manager preferably includes program modules that read the data from the Smart Object and then, based on the Smart Object's geometrical and behavioral parameters, create an animated mathematical representation of the Smart Object. This representation is rendered to the computer display, preferably by means of a rendering module within the Scene manager, using 3D rendering techniques known in the art.

In some preferred embodiments of the present invention, the Scene Manager comprises a "plug-in" to network browser software. The Scene Manager plug-in is installed and operated by a user of the browser software in a manner similar to other animation plug-ins known in the art. In these preferred embodiments, the Scene Manager can receive Smart Objects, preferably 3D Smart Objects, over the network and then can render images of the Smart Objects within or overlaid on the browser window on the computer display.

In other preferred embodiments of the present invention, the Scene Manager comprises an application program, which runs in the framework of an operating system, preferably a windows-based operating system, as is well known in the art. In these preferred embodiments, the Scene Manager operates to create animated images, as described herein, while other, generally unrelated applications, such as a word processor program, are simultaneously running on the computer.

In some preferred embodiments of the present invention, a computer animation sequence is controlled by scripts, which control the actions of the Smart Objects in the sequence, responsive to the attributes defined by the Smart Objects themselves. The scripts are preferably embedded within the Smart Objects, as described above, but may, alternatively or additionally, belong to the Scene Manager program, which interacts with and controls the Smart Objects. The scripts preferably comprise motion scripts, which include instructions to modify the position, orientation or other attributes of the Smart Objects over time, from one animation frame to the next. Additionally or alternatively, the scripts may comprise connection scripts, which link the Smart Objects to input devices, such as a mouse or 3D pointing device, which are then used to manipulate the Smart Objects in the display. Further additionally or alternatively, the scripts may comprise trigger scripts, which are invoked when a predetermined sensitivity condition or event occurs, for example, a collision of the Smart Object with another object or selection of the Smart Object in the display.

In some preferred embodiments of the present invention, an object, preferably a 3D Smart Object, is used in rendering an image element that is overlaid over a window in the display. For example, a suitable Smart Object may be used to produce a 3D image of a human figure, which walks across a window created by some other software application, such as an Internet browser or a word processor program. The window over which the image element is overlaid may be an Internet Web page, for example, and may include text or two- or three-dimensional graphics, or some combination of text and graphics. The software application associated with the window preferably continues to operate while the Smart Object is running. Preferably, attributes of the Smart Object and/or a script associated therewith cause the Smart Object to react to or interact with elements in the window, for example, by reading aloud text displayed in the window or pointing to an on-screen push-button control.

Preferably, the image element that is overlaid over the window obscures only the portion of the window immediately behind the element, while the remainder of the window is unobscured, and the application associated with the window continues to function. For each frame in a computer animation sequence involving the Smart Object, as the image element is rendered, a transparent mask is concomitantly created, defining the area of the display that will not be obscured by the image element. This mask is used to create a window for the Smart Object that is exactly shaped to fit a border circumscribing the image element. The shape of this window is adjusted in response to the full 3D motion of the Smart Object, unlike sprite overlaying methods known in the art, in which changes in the transparent areas of the sprites are substantially limited to 2D effects.

In some preferred embodiments of the present invention, a user interface is provided to enable a user to program and control Smart Objects and computer animation sequences using the Smart Objects. The user preferably creates animations by choosing Smart Objects from a library and/or by creating Smart Objects from libraries of sub-objects that define attributes of the appearance and behavior of the Smart Objects, as described above. Further preferably, the user interface enables the user to create scripts and otherwise define animation sequences including, for example, motion paths, sound and interactions of the Smart Objects with one another and/or with a viewer. In addition, the user interface preferably allows the user to define camera angles and simulated lighting characteristics that are applied in rendering the animation sequences on the computer display.

In one preferred embodiment of the present invention, the user creates a Smart Object which serves as an avatar for the user or for another individual. An image of the user or of another individual may preferably be scanned into the computer, as is known in the art, and overlaid on a surface of the image element corresponding to the Smart Object, preferably on the head of the image element.

In some of these preferred embodiments, the user interface enables the user to choose and navigate in virtual 3D space among predefined viewpoints. For each viewpoint, an image of an animation scene is rendered and displayed corresponding to an image of the scene that would be captured by a camera filming the scene from the location of the viewpoint. At each viewpoint, the user is able to alter the effective camera angle, up/down and left/right, and to zoom in or out. The viewpoints may be stationary, but preferably, paths are defined between reference points in the 3D space, along which paths the viewpoints are to move, so that the virtual camera position changes accordingly. Additionally or alternatively, a user may indicate a reference point in the 3D space and instruct the viewpoint to orbit around the point and/cr to move toward or away from the point. These methods for user control of the viewpoint are substantially easier for the user to conceptualize and control than are "free navigation" user interface tools known in the art, for example, "CosmoPlayer," a commonly-available VRML 2.0 browser program, described above.

In some of these preferred embodiments, the user interface includes on-screen graphic devices, with which the user interacts, preferably using a mouse or 3D pointing device, known in the art, to control the animation. These devices preferably include one or more sliders, push buttons, dubbing strips and other elements known in the art. The on-screen user interface devices are, preferably, automatically scaled, such that when the user resizes or changes the shape of the window on the computer screen in which the animation is displayed, the sizes, positions and spacing of the devices are adjusted accordingly. Adjusting the sizes and positions of the on-screen devices allows a maximal portion of the window to be used for displaying the animation and enhances the esthetic appeal of the display. The scaling of the user interface allows all of the controls to be seen simultaneously on the screen, even when the window is substantially reduced in size, unlike user interfaces known in the art, in which some or all of the controls disappear from the window under such conditions.

Among the on-screen devices, the user interface preferably includes a 3D joystick, which the user manipulates to navigate in the 3D space. The 3D joystick moves in a plane, thus controlling two degrees of freedom. Preferably, the joystick is used to control tilt and pan of a virtual camera from whose point of view the scene is rendered, while a slider controls the camera's zoom. Alternatively or additionally, the joystick may be used to control revolution of the virtual camera about a selected reference point in the scene.

Preferably, the portion of the window used for displaying the animation is not strictly rectangular, but is rather surrounded and framed by non-animated elements, including the user interface devices. The devices may penetrate into the edges of the frame containing the animated images. The non-rectangular frame is preferably designed to give the animated scene a more realistic appearance, as though it were taking place, for example, in an auditorium or a television studio.

In some preferred embodiments of the present invention, an associative visual search engine is provided to assist the user in selecting elements to be incorporated in a computer animation. The engine is used in searching through an image database that may include image representations of Smart Objects and sub-objects thereof, as well as other animations, still objects and background and border images. One or more keywords, generally a plurality of keywords, are associated with each of the images in the database. The keywords preferably describe various aspects of the images, including image subject, content, style, color and other attributes. The keywords associated with each image are preferably ordered hierarchically, from the keyword that is most descriptive of the image to keywords that are less descriptive thereof.

To use the search engine, a user preferably enters a keyword or selects an image from an initial group of images displayed on the computer screen. The engine then searches the database for images matching the keyword that was entered or matching a keyword or keywords associated with the selected image. The user may narrow the search by specifying a characteristic of the selected image to be matched, such as its subject matter or color, for example. Images in the database that are found by the engine to match the keyword or keywords are displayed on the computer screen in a hierarchical, preferably generally concentric pattern. Preferably, images matching the keyword or keywords most closely, i.e., images with respect to which the keyword or keywords searched for occupy the highest positions in the images' respective hierarchies of associated keywords, are positioned nearest the center of the display and scaled to a relatively large size. Images matching the keyword or keywords more remotely are positioned peripherally.

The user may browse through the images displayed on the screen by pointing to images of interest, for example, using a mouse. When the user points to an image, the image is preferably enlarged and/or expanded. If the image represents a 3D image element, it is preferably rendered in three dimensions. If the image represents an animation or animated object, for example, a Smart Object, at least a portion of the animation or a movement of the object is displayed. The user selects images from the search for inclusion in an animation sequence or, alternatively or additionally, selects an image to serve as the starting point for a new search.

It will be appreciated that the search engine and search method described above allows the user to search through an image database in a more intuitive manner than is possible with search engines and methods known in the art, and therefore enables the user to find suitable images more efficiently and quickly. Although the associative visual search engine described above is preferably used in generating computer animation sequences, as described herein, in other preferred embodiments of the present invention, the engine may be used advantageously for searching through image databases of other types and for other purposes.

In some preferred embodiments of the present invention, after the user has used a source computer to create a computer animation, the animation is encapsulated and conveyed over a network, preferably the Internet, to a destination computer. In this context, the term "computer animation" means a computer animation sequence, which is preferably created by the user as described above, or a Smart Object having attributes of motion. Encapsulating and conveying the animation comprises sending files associated with the animation over the network, preferably in the form of an electronic mail message or other network communication. Preferably, the animation file is encapsulated as a 3D VRML-compatible animation file, as described above, or alternatively, as a JAVA applet or HTML file or in another standard file format recognized by suitable Internet browser programs. When the animation is received, it may be replayed as an animation sequence on the destination computer display, or incorporated in an animation sequence running on the destination computer.

In some of these preferred embodiments, the animation sent from the source to the destination computer comprises an animated "letter," for example, a greeting card, sent by electronic mail. The letter preferably includes one or more Smart Objects, which are programmed at the source computer to convey a desired message and/or exhibit a desired behavior when animated on the destination computer.

In other preferred embodiments of this type, the animation sent from the source to the destination computer comprises an entertainment or educational program, distributed by a network server to a plurality of client computers. Each of the clients receives the animation as created and sent by the server, but the client user may then control certain aspects of the rendering of the animated images on the client computer screen, such as varying the viewpoint, lighting and appearance of the characters, for example. Preferably, the clients include both viewers, who receive the animation from the source but are allowed relatively little control over the animation, and participants, who may actually control a character appearing in the animation. Most preferably, each participant controls a respective character by defining the appearance and behavior of a Smart Object corresponding to the character.

In still other preferred embodiments of this type, the animation sent from the source to the destination computer comprises a Smart Object, preferably a 3D Smart Object programmed as an avatar of the user, as described above. Preferably, the avatar conveys an electronic mail message to a user at the destination computer. Additionally or alternatively, the avatar may be incorporated as a participant in an interactive, animated program on the destination computer, for example, as a participant in a conference, interview or panel discussion conducted over the Internet or another network.

There is therefore provided, in accordance with a preferred embodiment of the present invention, a method for producing an animation sequence on a graphic display driven by a computer, including:

defining an object, which includes data including a geometrical description of an animated character and characteristics of social behavior of the character; and animating an image of the character responsive to the characteristics.

Preferably, defining the object includes programming a predetermined response of the character to a sensitivity condition occurring externally to the object.

Further preferably, programming the predetermined response to the interaction condition includes programming a rule governing motion of the object responsive to the condition.

Additionally or alternatively, defining the object includes defining sufficient characteristics of the behavior of the character such that the image is animated substantially without reference to animation instructions external to the object.

Preferably, animating the image includes rendering a three-dimensional image of the character.

There is also provided, in accordance with a preferred embodiment of the present invention, a method for producing an animation sequence on a graphic display driven by a computer, including:

defining a group of objects, each such object associated with a respective animated character and including data, which includes:
a geometrical skeleton common to all the objects in the grouped, characterized by a hierarchy of sub-objects connected by joints; and
rules governing behavior of the respective character, which rules define motions of the joints and are interchangeable among any of a plurality of the objects; and animating an image of at least one of the characters responsive to the rules.

Preferably, defining the group of objects includes defining a three-dimensional skeleton, and animating the image includes rendering a three-dimensional image.

Additionally or alternatively, defining the group of objects includes defining rules governing behavior of a predetermined personality type, associated with one or more of the animated characters.

Preferably, defining the group of objects includes defining first and second objects, wherein the second object is defined by inheritance from the first object.

There is further provided, in accordance with a preferred embodiment of the present invention, a method for providing a user interface in a computer graphic display, including:

displaying one or more user control icons in a window in the display; and scaling the one or more icons responsive to a change of scale of the window.

There is also provided, in accordance with a preferred embodiment of the present invention, a method for producing an animation sequence on a graphic display driven by a computer, including:

producing a frame image having a non-rectangular transparent area;

generating an animation sequence on the display; and overlaying the frame image on the animation sequence, so that the animation is framed by the transparent area.

In accordance with another preferred embodiment of the present invention, there is additionally provided a method for producing an animation sequence on a graphic display driven by a computer, including:

defining a three-dimensional geometrical description of an animation scene;

selecting first and second reference points relative to the scene and defining a geometrical path dependent on the points;

rendering a first image of the scene as seen from a viewpoint at a first position on the geometrical path;

translating the viewpoint to a second position along the geometrical path; and rendering a second image of the scene as seen from the second position.

There is additionally provided, in accordance with a preferred embodiment of the present invention, a method for producing an animated overlay image on a graphic display driven by a computer, including:

generating a three-dimensional animated image element; and overlaying the animated image element on a window in the graphic display driven by a software application substantially unrelated to the generation of the animated image element.

Preferably, the substantially unrelated software application continues to run substantially as though the image element was not overlaid on the window, and the only portion of the window obscured is the portion directly behind the image element on the graphic display.

There is also provided, in accordance with another preferred embodiment of the present invention, a method for conveying an animation from a source computer to a destination computer, including:

defining an object in the source computer, the object including data, which includes a graphic description of an element for inclusion in the animation and a characteristic of motion of the element;

transmitting the object from the source computer to the destination computer via a network; and displaying an animated image on a display driven by the destination computer, wherein the image includes a graphic rendition of the element, moving in accordance with the characteristic.

Preferably, transmitting the object via the network includes encapsulating the object and transmitting the encapsulated object in the form of an electronic mail message.

Alternatively or additionally, a script is transmitted over the network, which script defines an animation sequence including the element, and wherein transmitting the object and transmitting the script include transmitting the object and the script to a plurality of destination computers.

In accordance with another preferred embodiment of the present invention, there is moreover provided a method for finding a desired image among a library of images stored by a computer, including:

displaying a first plurality of images from the library on a display associated with the computer;

selecting a first image from among the first plurality; and searching through the library to find a second plurality of images resembling the first image in one or more characteristics thereof.

Preferably, a cursor is shown on the display and one of the images is altered when the cursor points to the one of the images, preferably by animating the image.

There is further provided, in accordance with a preferred embodiment of the present invention, a system for producing an animation sequence, including:

an animation generator, which generates an animated image of a character, responsive to an object including a geometrical description of the character and characteristics of social behavior of the character; and a display, which is driven by the computer to display the animated image.

In addition, in accordance with another preferred embodiment of the present invention, there is provided a system for producing an animation sequence, including:

an animation generator which generates an animated image of at least one character from a group of characters, responsive to a respective one of a group of objects, wherein the objects include a geometrical skeleton common to all the objects in the group, characterized by a hierarchy of sub-objects connected by joints, and rules governing behavior of the respective characters, which rules define motions of the joints and are interchangeable among any of a plurality of the objects; and a display, which is driven by the computer to display the animated image.

There is also provided, in accordance with a preferred embodiment of the present invention, a system for producing graphic images, including:

an animation generator, which generates a scalable graphic window with one or more user interface icons contained therein, such that the icons are scaled responsive to a scale of the window;

a user input device for scaling the window; and a display, which is driven by the computer to display the window with the icons.

There is moreover provided, in accordance with a preferred embodiment of the present invention, a system for producing an animation sequence, including:

an animation generator, which generates an animation sequence and which produced a frame image having a non-rectangular transparent area, such that the frame image is overlaid on the animation sequence, whereby the animation is framed by the transparent area; and a display, which is driven by the computer to display the animation sequence framed by the transparent area.

Additionally, in accordance with another preferred embodiment of the present invention, there is provided a system for producing an animation sequence, including:

an animation generator, which renders animated images of a three-dimensional scene, each image rendered as seen from a respective viewpoint, including a first image of the scene as seen from a first viewpoint along a predetermined geometrical path and a second image of the scene as seen from a second viewpoint along the path;

a user input device, for selecting first and second reference points, which determine the geometrical path; and a display, which is driven by the computer to display the animated images.

There is further provided, in accordance with a preferred embodiment of the present invention, a system for producing an animated image, including:

an animation generator, which generates a three-dimensional animated image element and produces a display window driven by a software application substantially unrelated to the generation of the animated image element, and which overlays the animated image element on the window; and a display, which is driven by the computer to display the window with the animated image overlaid thereon.

There is further provided, in accordance with a preferred embodiment of the present invention, a system for conveying an animation over a network, including a source animation generator, coupled to the network, which defines an animation file comprising an object, which includes a graphic description of an image element for inclusion in the animation and a characteristic of motion of the element and transmits the object over the network in the form of an electronic mail message.

In accordance with another preferred embodiment of the present invention, there is provided a system for conveying an animation over a network, including a network animation server, which receives a textual description of an animation object, generates an animation file based thereon, and delivers the animation file to a destination computer.

There is also provided, in accordance with another preferred embodiment of the present invention, a system for viewing an animation, including:

a destination animation generator, coupled to a network, which receives via the network a script defining the animation along with an object including a geometrical description of an image element for inclusion in the animation and a characteristic of motion of the element, and renders animated images responsive thereto;

user controls, coupled to the destination animation generator, for controlling rendition of the animated images; and a display, which is driven by the destination animation generator to display the animated images.

There is additionally provided, in accordance with a preferred embodiment of the present invention, a system for searching a library of images, including:

image storage apparatus, which stores the library of images and selects a first plurality of the images to be displayed;

a display, which is driven by the image storage apparatus to display the images selected by the animation generator ; and a user input device, coupled to the image storage apparatus, for pointing to and selecting a first image from among the first plurality of the images displayed, wherein the animation generator searches through the library and selects images resembling the first image in one or more characteristics thereof, for inclusion in a second plurality of images.

The present invention will be more fully understood from the following detailed description of the preferred embodiments thereof, taken together with the drawings in which:

BRIEF DESCRIPTION OF THE DRAWINGS

FIG. 4 is a block diagram illustrating the program structure of a 3D Smart Object, in accordance with a preferred embodiment of the present invention;

DETAILED DESCRIPTION OF PREFERRED EMBODIMENTS

Figure 1:
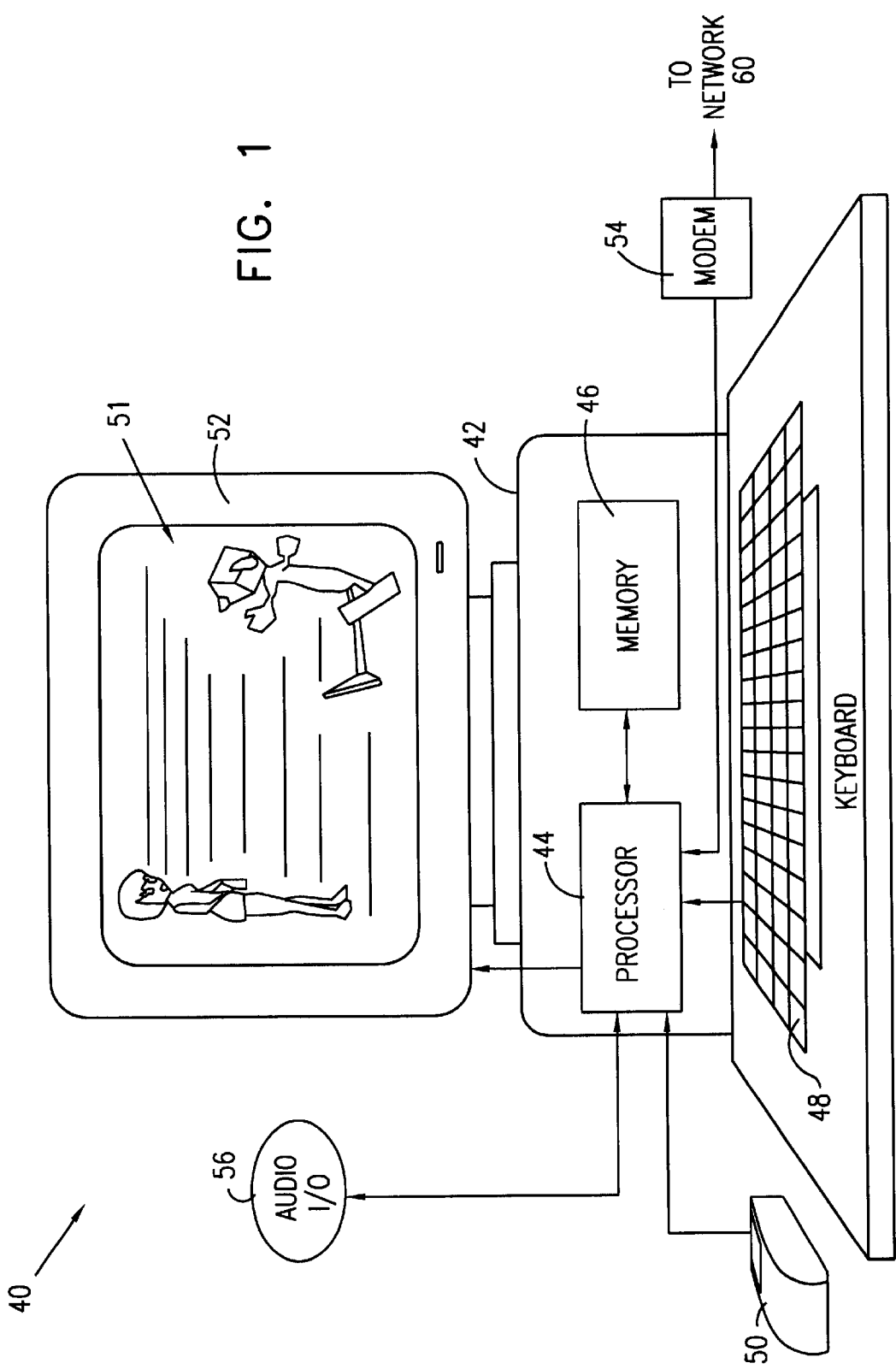
FIG. 1 is a schematic representation of a computer system for use in producing and displaying animation sequences, in accordance with a preferred embodiment of the present invention.

Reference is now made to FIG. 1, which is a schematic representation of an animation generator, preferably a computer system 40, for use in producing and displaying computer animation sequences, in accordance with a preferred embodiment of the present invention. Computer 40 comprises a console 42, including a processor 44 and memory 46, preferably comprising both RAM and disk memory, as are known in the art. The computer also includes user input devices, such as a keyboard 48 and pointing device 50, for example, a mouse.

Computer 40 includes image rendering software, such as RenderWare, described above, which enables processor 44 to produce animated computer graphic images 51, which are seen on a display 52. Animated images 51 are preferably produced in response to an animation program, run by processor 44, preferably a Scene Manager program, which generates images based on 3D Smart Objects, as described herein. Preferably, the images are accompanied by sound, which is produced by an audio device 56, such as a speaker, coupled to the processor.

Computer 40 is preferably coupled via a modem 54 to a computer network 60, preferably the Internet, and sends and receives animation files over the network, as described below. Further preferably, the computer includes browser software, for example, a VRML-compatible browser, suitable for viewing animations conveyed over the network.

Figure 2:
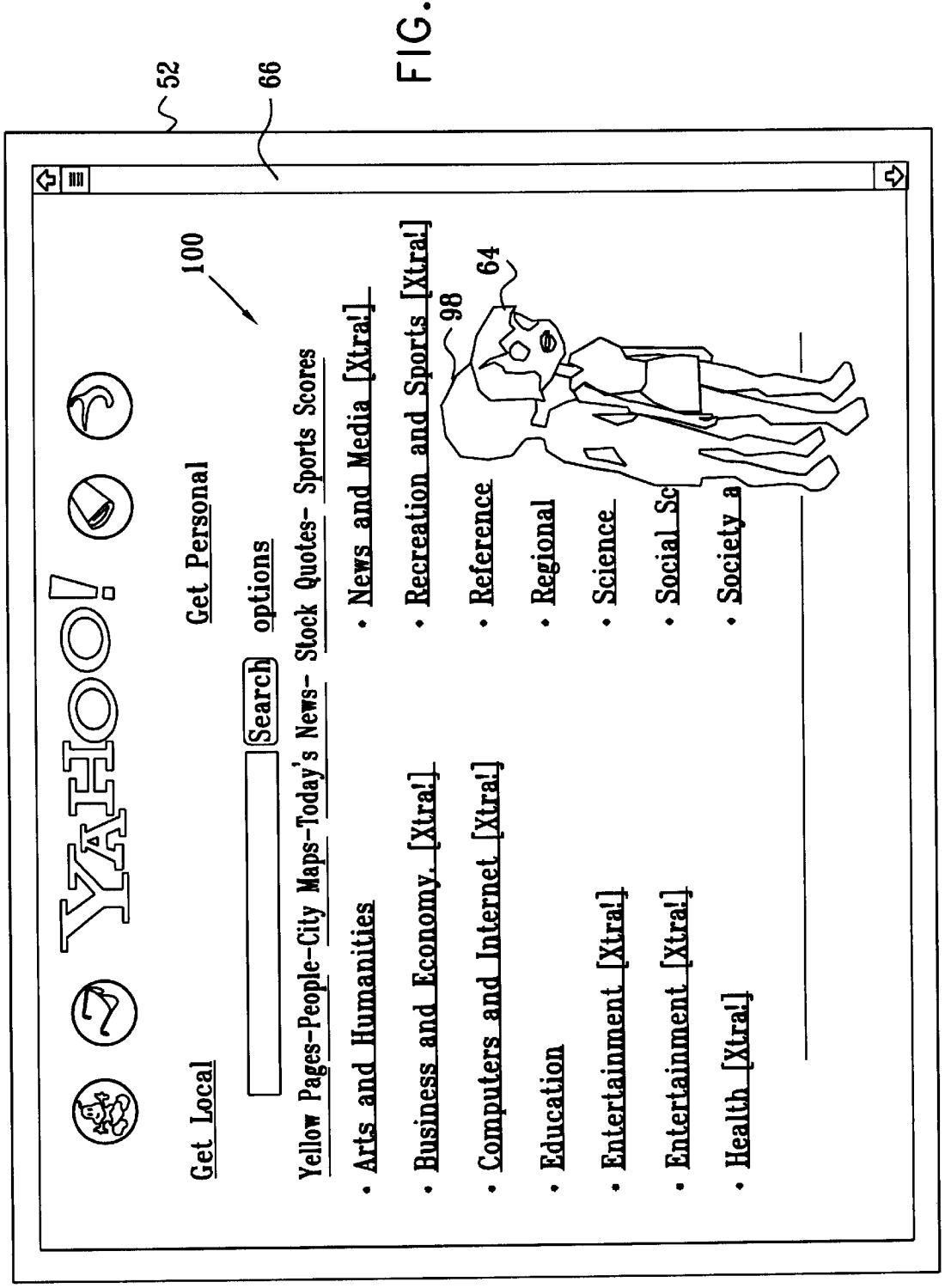
FIG. 2 is a graphic representation of a computer image element generated on a computer display screen by a Scene Manager responsive to a 3D Smart Object, in accordance with a preferred embodiment of the present invention.

FIG. 2 is a graphic representation of display 52, showing an animated image produced by processor 44 based on a 3D Smart Object, representing a young female character 64. The animated character, rendered as a 3D image, is seen to walk out on screen and take a position in front of an application window 66. The application that drives window 66 is generally unrelated to the Scene Manager animation program and to the Smart Object, and the application continues to run substantially uninterrupted by the animated image. Character 64 obscures only the portion of window 66 that the character directly covers, while the rest of the window remains normally active and visible, as though character 64 were absent. The software structure and methods used in producing the animation and overlaying the character on the window are described below.

As described above, the term "Smart Object" as used herein, in accordance with preferred embodiments of the present invention, refers to an object, or module, comprising both the graphic/mathematical description of an image element and embedded ancillary information about the element. Such ancillary information preferably comprises procedures, which describe attributes, motion and behavior of the element, as described hereinbelow, and may also include textual reference data. These procedures are preferably in the form of scripts, i.e., lists of instructions that are read and executed by the Scene Manager. "3D Smart Objects" preferably include attributes of shape and motion that are used in rendering 3D images of the corresponding image elements.

Figure 3A:
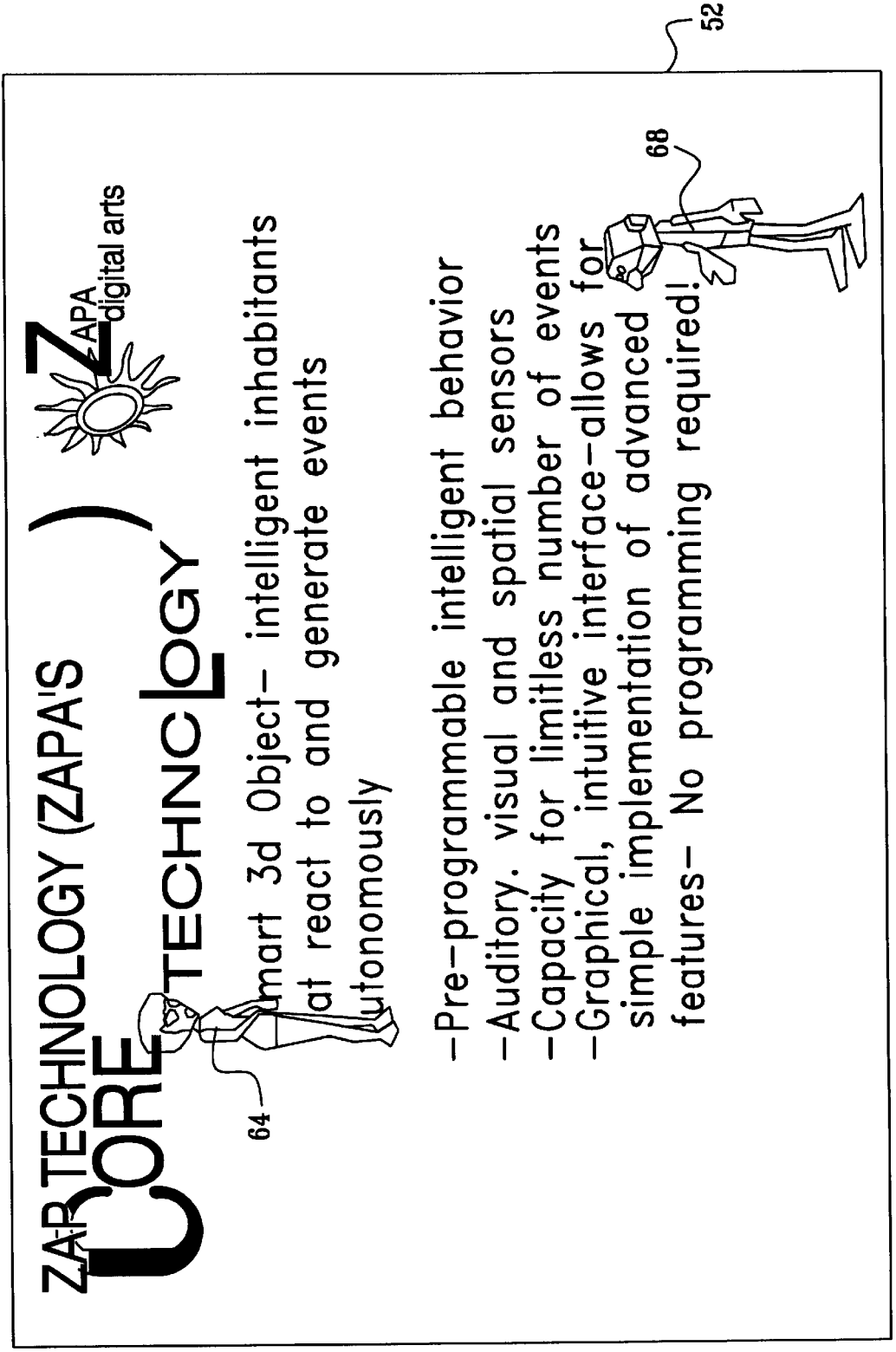
FIGS. 3A and 3B are graphic representations of the computer image elements generated on the computer display screen by Smart Objects, illustrating animation of the elements in response to one another, in accordance with a preferred embodiment of the present invention.
Figure 3B:
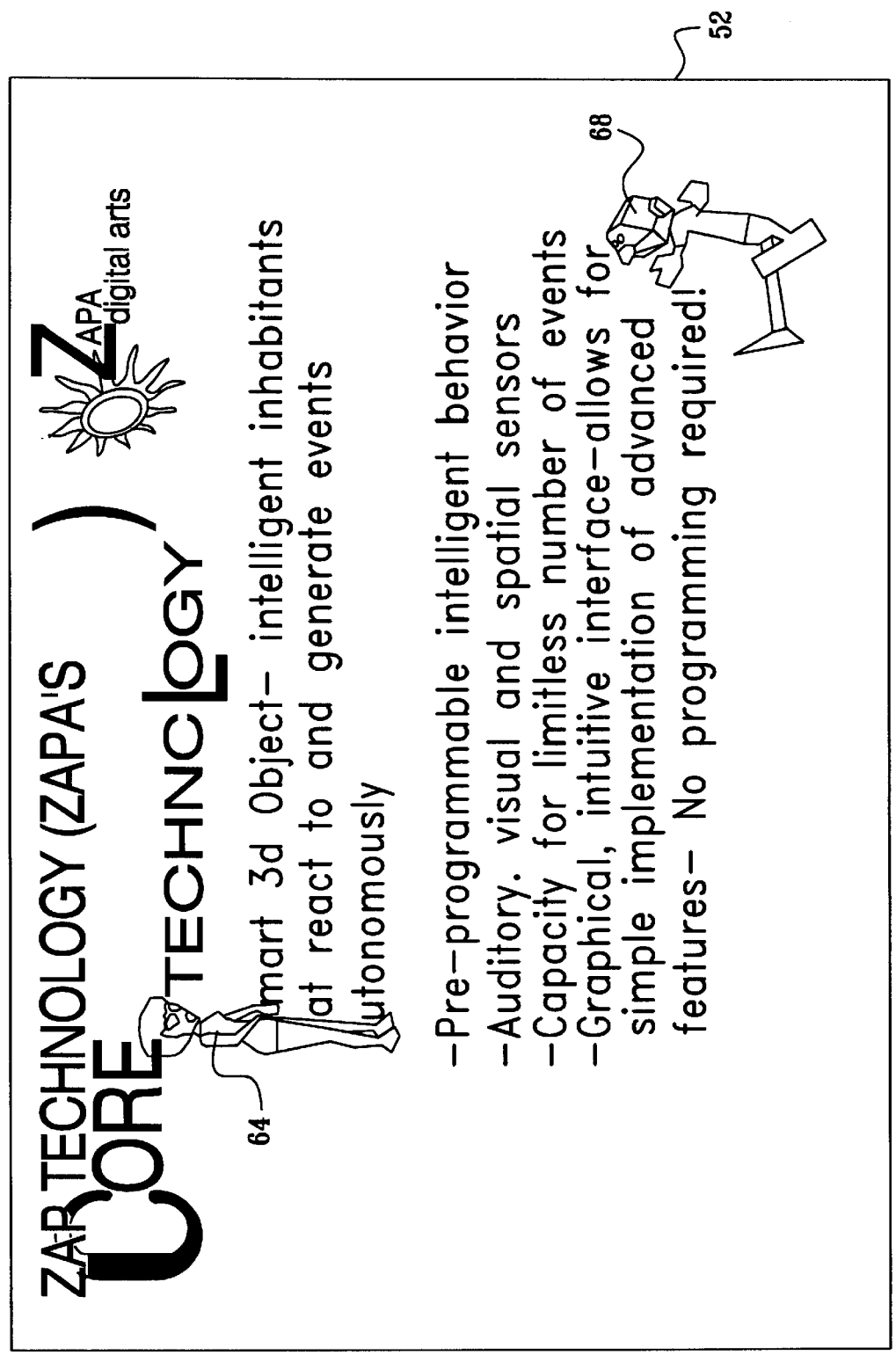

FIGS. 3A and 3B are graphic representations of display 52, showing animated images produced by processor 44, which illustrate further aspects of the behavior of 3D Smart Objects. In FIG. 3A, young female character 64 has walked out onto the screen, while a male character 68 stands at the opposite side. The Smart Object corresponding to male character 68 includes animation scripts that define the character's behavior in response to young female characters. These scripts are triggered by the presence of female character 64 within a predetermined region of proximity to male character 68. For character 68, the region of proximity is determined to be the entire area of display 52.

As shown in FIG. 3B, in response to the proximity of female character 64, the scripts that are triggered cause male character 68 first to look at the female character and then to jump excitedly. The scripts that determine these behaviors are contained entirely within the Smart Object, so that the response of male character 68 to female character 64 is generated substantially autonomously by the Smart Object. There is no need for a script or program external to the Smart Object to create the behavior, although it is possible to manipulate Smart Objects using such external scripts.

Furthermore, although character 68 exhibits, in this case, behavior that would be characteristic of a young male, the behavior may be transferred in a modular fashion from one Smart Object to another, independent of their physical appearance and other characteristics. Thus, for example, any or all of the behavioral routines that make up the young, male "personality" assumed by character 68 may be transferred to another character having the appearance of an old man or woman, or of a robot. It is sufficient to transfer the specific routines that are triggered by the proximity of female character 64 to cause the other character to look at the female character and jump excitedly. Unlike animation programs known in the art, no other reprogramming or adjustment of the animation of the other character is generally needed.

3D SMART OBJECTS

FIG. 4 is a block diagram illustrating the data structure of a 3D Smart Object 70, in accordance with a preferred embodiment of the present invention. The hierarchical structure of Smart Object 70 is what makes possible the autonomy and modularity of Smart Objects, as described above with reference to FIGS. 3A and 3B.

Smart Object 70 comprises a skeleton, including surfaces 76, a hierarchy of organs 78 and behaviors 74. Organs 78 are made up of sub-organs 90, which are in turn made up of 3-D objects 86, comprising 3D geometrical shapes connected by joints, as are known in the art. The term "organ," as used herein, refers to a coherent group of 3D objects 86 that form a part of the physical representation of the Smart Object. Surfaces 76 and surface details 94, as described below, relate to corresponding 3D objects 86 and define these objects' surface appearance when the Smart Object is rendered to display 52. While the skeleton of Smart Object 70 is common to all Smart Objects of a given class, for example, humanoid Smart Objects, each Smart Object in the class has its own specific geometry 72, defined by the set of 3D objects 86 and surface details 94 belonging to the Smart Object.

Behaviors 74 include 3D animations 88 of the Smart Object, defining motions of organs 78 and sub-organs 90 at joints thereof. The behaviors may also operate on surfaces 76, for example, by changing the color of a selected surface under certain predefined circumstances. Animations 88 are preferably grouped as mandatory animations 80, conditional animations 82 and optional animations 84. The meanings of these groupings are discussed below. Preferably, behaviors 74 belonging to a given Smart Object are chosen and programmed so that the Smart Object exhibits a desired personality, such as the "young male" personality of character 68 (FIGS. 3A and 3B). In the context of the present patent application and in the claims, the term "personality" used in reference to a Smart Object or an animated character associated therewith refers to a set of behaviors that cause the character to move and otherwise exhibit reactions and expressions in a manner that is reminiscent of the behavior of a real character, typically a human being, of a certain type.

Although the hierarchies of geometry 72 and behaviors 74 are separate, there is a complete correspondence between the set of 3D animations 88 and the set of 3D objects 86. In other words, each animation 88 comprises a mathematical description that dictates operations to be performed in a predetermined way on certain objects 86 in the geometrical hierarchy. Each animation 88 operates on certain organs 78 and sub-organs 90 and the joints connecting them.

The same hierarchies of geometry and behavior are used for all Smart Objects of a certain type, for example, humanoid characters or four-legged creatures, or inanimate (but possibly animated) objects, such as tables or chairs. Therefore, 3D objects 86 and 3D animations 88 may be exchanged freely, in modular fashion, among all Smart Objects of the type, i.e. Smart Objects derived from the same skeleton, whether at the level of individual objects and animations or at the levels of organs 78 or groups of animations 80, 82 and 84. By transferring such groups of animations, the personality of a Smart Object corresponding to a humanoid character may be transferred to or inherited by another Smart Object. Similar conventions apply to surfaces 76 and to sub-organs 90, as described below.

The hierarchical structure of Smart Object 70 is constructed using 3D animation software tools known in the art, for example, LightWave 5.0 software, as described above. The full modularity of the behavior of Smart Objects, however, is not achieved by animation objects and systems known in the art, and files corresponding to Smart Objects that are created initially using LightWave, for example, must be converted to Smart Object form. Smart Objects have all the features of an object-oriented programming system. They enable animated characters to be created by transfer of physical and/or behavioral characteristics between different Smart Objects or between a Smart Object and a library of such characteristics, while leaving the hierarchy intact. New Smart Objects and classes of Smart Objects may be created by inheritance from existing Smart Objects, including multiple inheritance, as is known generally in areas of conventional object-oriented programming.

Software File C, incorporated herein, includes a converter program, Converter.zip, in ZIP-compressed hexadecimal form, for producing a 3D Smart Object from an object initially constructed using LightWave 5.0, in accordance with a preferred embodiment of the present invention. The converter operates under the "Windows 95" operating system. To use the program, Converter.zip is "unzipped," as is known in the art, to create a directory named "convertData," including the program ConverterUI.exe. The following Windows dll's must be copied into the directory: Mfc42d.dll, Msvcirt.dll, Msvcirtd.dll and Msvcrtd.dll. When ConverterUI.exe is run, a user interface is presented including a "Convert" button. When "Convert" is selected, a sample conversion script entitled "George-concrete.zcs" is run.

Grouping of 3D objects 86 into organs 78 and sub-organs 90 serves the purpose of enabling objects to be exchanged among Smart Objects in such a way that an appearance of natural motion of the animated image element corresponding to the Smart Object is preserved, and that suitable proportions are maintained between closely-related 3D objects 86 and groups of such objects. It will be understood that sub-organs 90 are themselves treated as organs, and furthermore, that a sub-organ may contain other sub-organs, below it in the hierarchy. Thus, for example, the hands of a humanoid skeleton are defined as one sub-organ, so that both hands are exchanged as a single unit. The basic hierarchy of organs 78 and sub-organs 90 and 3D objects 86 in skeleton 70 of a humanoid Smart Object is preferably defined by the following file structure, wherein the term "name" in each case refers to the reference name of a Smart Object character with which the organ, sub-organ or object is associated:

--- basenull
   cameranull
      name_abdomen
         name_body
            name_an_back
            name_hand_lt_01_upperarm
               name_hand_lt 02_lowerarm
                  name_hand_lt_03_palm
                     name_hand_lt_04_fingers
                     name_hand_lt_05_thumb
            name_hand_rt_01_upperarm
               name_hand_rt_02_lowerarm
                  name_hand_rt_03_palm
                     name_hand_rt_04_fingers
                     name_hand_rt_05_thumb
         name_neck
            name_head
               name_an_head
               name_an_mustache
               name_brow_lt
               name_brow_rt
               name_eye_lt
               name_eye_rt
               name_eyelid_lt
               name_eyelid_rt
               name_mouth
               name_ponytail_01

-continued name_ponytail_02
                  name_ponytail_03
name_leg_lt_01_thigh
   name_leg_lt_02_shin
      name_leg_lt_03_shoefront
         name_leg_lt 04 shoeback
name_leg_rt_01_thigh
   name_leg_rt_02_shin
      name_leg_rt_03_shoefront
         name_leg_rt_04_shoeback
name_tail_01
   name_tail_02
      name_tail_03

---

The above hierarchy of organs 78 and sub-organs 90 is largely self-explanatory, but includes a number of unique features. The abbreviation "an" in certain of the above organs, for example, "name_an_head," refers to an "accessory null," for attaching an external accessory, such as a hat, in the case of name_an_head, to the associated organ. The expression "cameranull" refers to an optional connection point for attaching a "virtual camera" to the Smart Object, so that an image of an animation scene is rendered as seen from the point of view of the Smart Object. The expression "basenull" refers to a dummy joint, at which one Smart Object may be connected to another if desired.

Surfaces 76 comprise mathematical descriptions of the external appearance of organs 78, sub-organs 90 and 3D objects 86. A surface can include geometrical items belonging to several organs. For example, a shirt surface includes geometrical data belonging both to the body and to the arms. When the image of Smart Object 70 is rendered to computer screen 52, the surfaces are mapped onto the 3D-objects by suitable rendering software, such as RenderWare, described above, so that each 3D object 86 is shown on the screen with a surface appearance determined by the corresponding sub-surfaces and surface details.

Like 3D objects 86, surfaces 76 and surface details 94 may be exchanged and inherited freely among Smart Objects of the same type. The term "inherit" is used in the present patent application and in the claims in the sense of the term that is known in the art of object-oriented programming, to mean that 3D objects and surfaces may be taken from one Smart Object and used directly in creating a new Smart Object without additional adaptation. Animations 88 can similarly be exchanged and inherited, as described below. Preferably, surfaces 76 of a humanoid Smart Object include:

name skin
  name body top (generally the shirt)
  name body bottom (generally skirt or pants)
  name hair
  name eyes (iris)
  name shoes
  name lips Surface details 94 are defined so as to enable the user to edit the colors, shapes, textures and other surface features that are mapped onto 3D objects 86 when the Smart Object is rendered to display screen 52. For example, surface details 94 of a humanoid Smart Object preferably include:

name eyes pupils
  name skin face
  name skin face nose
  name skin face ears and so forth. Surface details 94 may further include a logo, for example, text or an insignia, to be displayed on the shirt of a character rendered on screen 52

Every Smart Object 70 includes a set of mandatory animations 80 that define the basic behaviors of the animated character associated with the Smart Object. Preferably, mandatory animations 80 for a humanoid skeleton include the following motions:

1. Appear.
2. Disappear.
3. Advance (three variations—fast, slow and "slow motion").
4. Idle (3 variations).
5. Talk.
6. Positive.
7. Negative.
8. Greeting (2 variations).
9. Don't know (perplexity or uncertainty).
10. Yes.
11. No.
12. Special.

Each of mandatory animations 80 comprises a mathematical description of motion of the Smart Object corresponding to a predetermined type of behavior, generally indicated by the name of the animation. "Idle" refers to behavior assumed by an animated character associated with Smart Object 70 when the Smart Object has not been selected or activated to modify its position, orientation or other attributes for a predetermined period of time. Idle behavior of character 68 (FIGS. 3A and 3B) could include, for example, crossing his arms and tapping his foot if female character 64 does not appear. Each Smart Object also includes a "Special" animation, specific to its character type. Preferably, Smart Object 70 also includes optional animations 84. The optional animations can include variations on mandatory animations, for example, walking in a way that a viewer of the animation would associate with "cool" or "sexy" behavior, in addition to the three mandatory "advance" animations. Additionally or alternatively, optional animations 84 can include animations specific to a certain type of Smart Object. For example, a soccer player Smart Object can have a "kicking" animation. Preferably, Smart Object 70 also includes a set of conditional animations 82, which define the response of the Smart Object to "sensitivity conditions," i.e., events or interactions that trigger the animations. Such events and conditions may include, for example, proximity to or collision with another object (which may or may not be a Smart Object) or selection of the Smart Object by a user. The conditional animations preferably comprise scripts, which call for predetermined mandatory and/or optional animations in response to sensitivity conditions. It will thus be understood that the reaction of young male character 68 to female character 64, shown in FIG. 3B, is controlled by an appropriate conditional animation within the Smart Object associated with male character 68, responsive to the proximity of the female character thereto. As a further example, selection of character 68, by pointing to the character and/or clicking on the character using mouse 50 (FIG. 1), preferably triggers a conditional animation that causes the character to turn to face the user or, alternatively or additionally, to change color, smile, wave or exhibit any desired behavior.

It will be understood that conditional animations 82 are as much a part of Smart Object 70 as are the features of the Smart Object's geometry 72. Taken together with mandatory animations 80 and optional animations 84, the conditional animations define rules of behavior that impart to the Smart Object a substantially autonomous "personality." Although the Smart Object may be animated using a program, such as a script, that is external to the Smart Object, no such external script is required to engender the autonomous motion and response animation of the Smart Object. When an external script is used, it is generally sufficient that the script include lines for the Smart Object characters to speak, positions that they are to assume in a scene, and calls to animations 80 and 84 that the Smart Objects are to undertake.

As described above, all 3D animations 88 defining behavior 74 of Smart Objects of a certain type, such as humanoid characters, correspond strictly to the skeleton of organs 78 and sub-organs 90 belonging to the type. As long as the skeleton is unchanged, each animation 88 operates on specific organs 78, sub-organs 90 and 3D objects 86, irrespective of their shapes and sizes. In consequence, the behaviors of Smart Objects are entirely modular, just as the elements of their geometry and physical appearance are. Smart Object behaviors are themselves objects that may be exchanged and inherited freely between characters, without the need for reprogramming when the behaviors are changed or exchanged.

Figure 5:
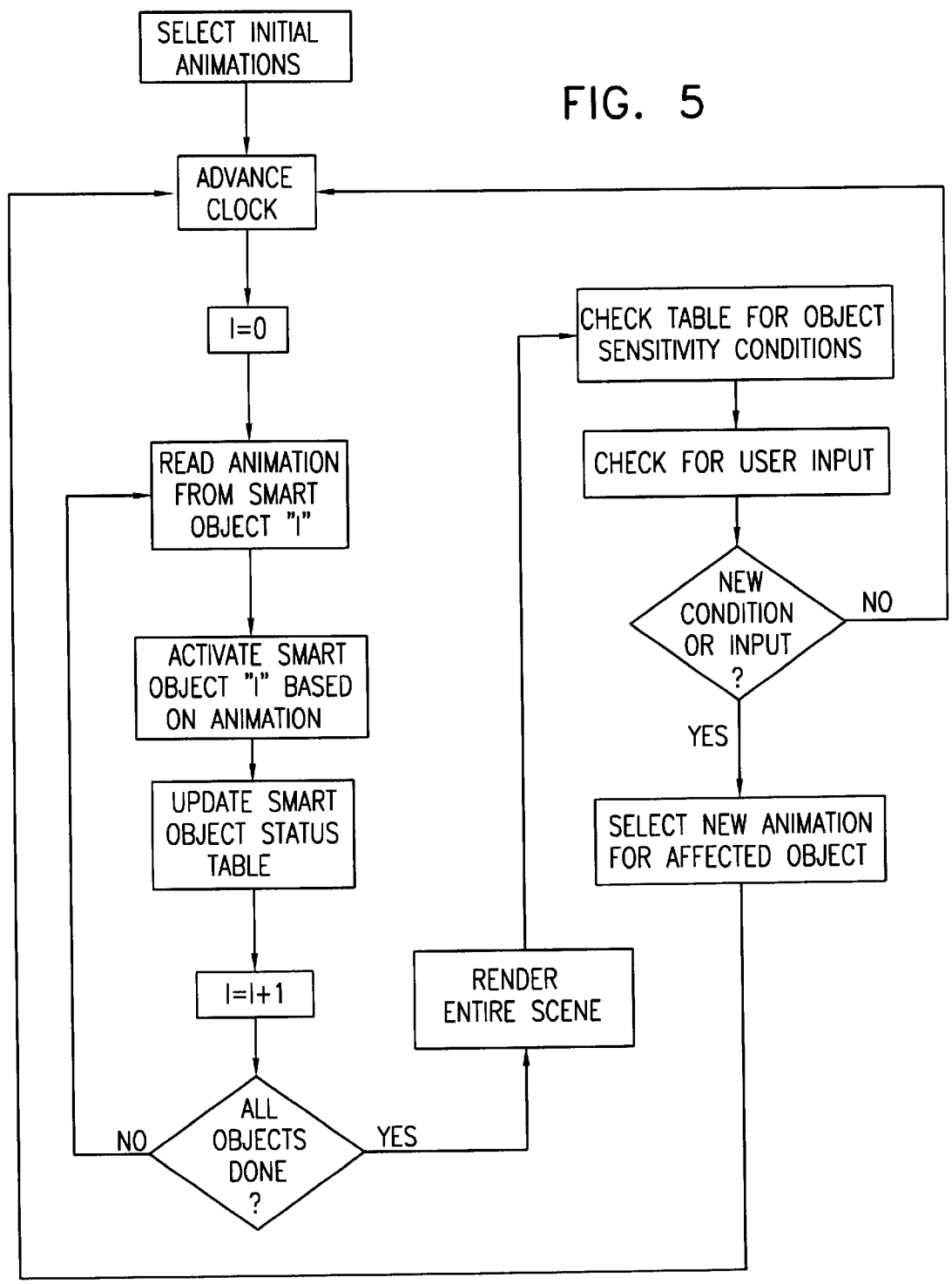
FIG. 5 is a flow chart illustrating a method of generating a computer animation sequence including the 3D Smart Object of FIG. 4, in accordance with a preferred embodiment of the present invention.

FIG. 5 is a flow chart illustrating a method for animating one or more Smart Objects 70 in an animation scene, based on autonomous behavior 74 of the Smart Object, in accordance with a preferred embodiment of the present invention. As described above, the method makes use of a "Scene Manager" program to coordinate the actions of Smart Object 70 and other objects in the scene. The Scene Manager reads geometrical data 72 and animations 88 from each Smart Object 70, and uses them as input data for an executable program module, controlled by the Scene Manager, including a moving geometrical representation of the Smart Object. Preferably, the Scene Manager maintains a table indicating the status of all the Smart Objects in the scene, including their positions and sensitivities, i.e., conditions and events capable of triggering conditional animations 82 belonging to each of the Smart Objects. Further preferably, the Scene Manager also includes image rendering routines, for example, executable code belonging to RenderWare, as described above, for rendering an image based on the geometrical representation of the Smart Object to display 52.

The Scene Manager preferably runs as a plug-in software module together with network browsing software known in the art, such as Netscape "Navigator," version 3.0 or higher, or Microsoft "Internet Explorer," version 3.0 or higher. Alternatively or additionally, the Scene Manager can run as a stand-alone application, preferably in a windows-based operating system, most preferably a Microsoft "Win32"-type operating system, as is known in the art.

As shown in FIG. 5, after initial animations have been selected for each Smart Object in an animation scene, each cycle of the method begins with a "tick," or incremental advance, of a system clock that drives the animation scene. Each Smart Object in the scene is indicated by an index I. At each tick, the Scene Manager reads the selected animation from each of the Smart Objects in sequence, either the initially-selected animation or another animation selected later, as described below. The Scene Manager activates the program module corresponding to the Smart Object to perform the selected animation. The animation causes the program module to alter the status of the geometrical representation of the Smart Object, for example, its position, orientation, expression or other aspects of its physical appearance. The program module, in turn, sends a message back to the Scene Manager indicating its new status, and updating the table of Smart Object status accordingly. This process continues until all of the Smart Objects in the scene have been activated. The Scene Manager then renders an image of the Smart Objects, based on the new status of the geometrical representations.

After all of the Smart Objects have been activated, the Scene Manager checks the updated status table of the Smart Objects in the animation scene, to determine whether any sensitivity conditions have been created. Preferably, the Scene Manager also checks whether a user has provided any input that would have an impact on any of the Smart Objects, for example, selecting one of the Smart Objects using pointing device 50 (FIG. 1). If no new sensitivity condition has been created and no user input has been provided, the system clock is advanced, and the cycle repeats.

If the Scene Manager detects that a new sensitivity condition has been created for any of the Smart Objects, however, the Scene Manager informs the Smart Object of the change and triggers the appropriate conditional animation of the Smart Object. The clock is then advanced, and the cycle repeats. Thus, referring again to the example shown in FIG. 3B, when the Scene Manager detects that female character 64 has moved into sufficient proximity to male character 68, the Scene Manager triggers an appropriate "excited" animation of the male character. The subsequent behavior of the male character is controlled by the Smart Object itself, until the Scene Manager detects a significant change in the position of the female character or until some new sensitivity condition arises.

The method illustrated by FIG. 5 is simplified for the sake of clarity of explanation. It will be appreciated that the Scene Manager may fulfill other functions besides those described above. For example, as described above, the Scene Manager may apply an external animation script to the Smart Object. Similarly, other animation and rendering programs may be used to animate Smart Objects. It will also be appreciated that the method described above may be applied to a single Smart Object, as well as to a plurality of interacting Smart Objects.

TRANSPARENT 3D GRAPHIC OVERLAYS

Referring back to FIG. 2, it is observed that 3D character 64 is overlaid on application window 66, while covering only that part of the window that is directly behind the character. Character 64 appears to cast a shadow 98 on window 66, but the shadow is preferably at least partly transparent, and the window text 100 is seen through the shadow.

Character 64 is superimposed on window 66 using a method referred to herein as "Transparent 3D." Although transparent image overlays, commonly called sprites, are known in the art, they are generally limited to images produced by 2D rendering and allow only 2D motion of the characters or objects in the images. A sense of depth is achieved only when 2D sprites are overlaid one upon another. By contrast, transparent 3D image element 64 in FIG. 2 is fully three-dimensional in its rendering, as well as in the range of animated motions that it can undertake, as described below.

Figure 6A:
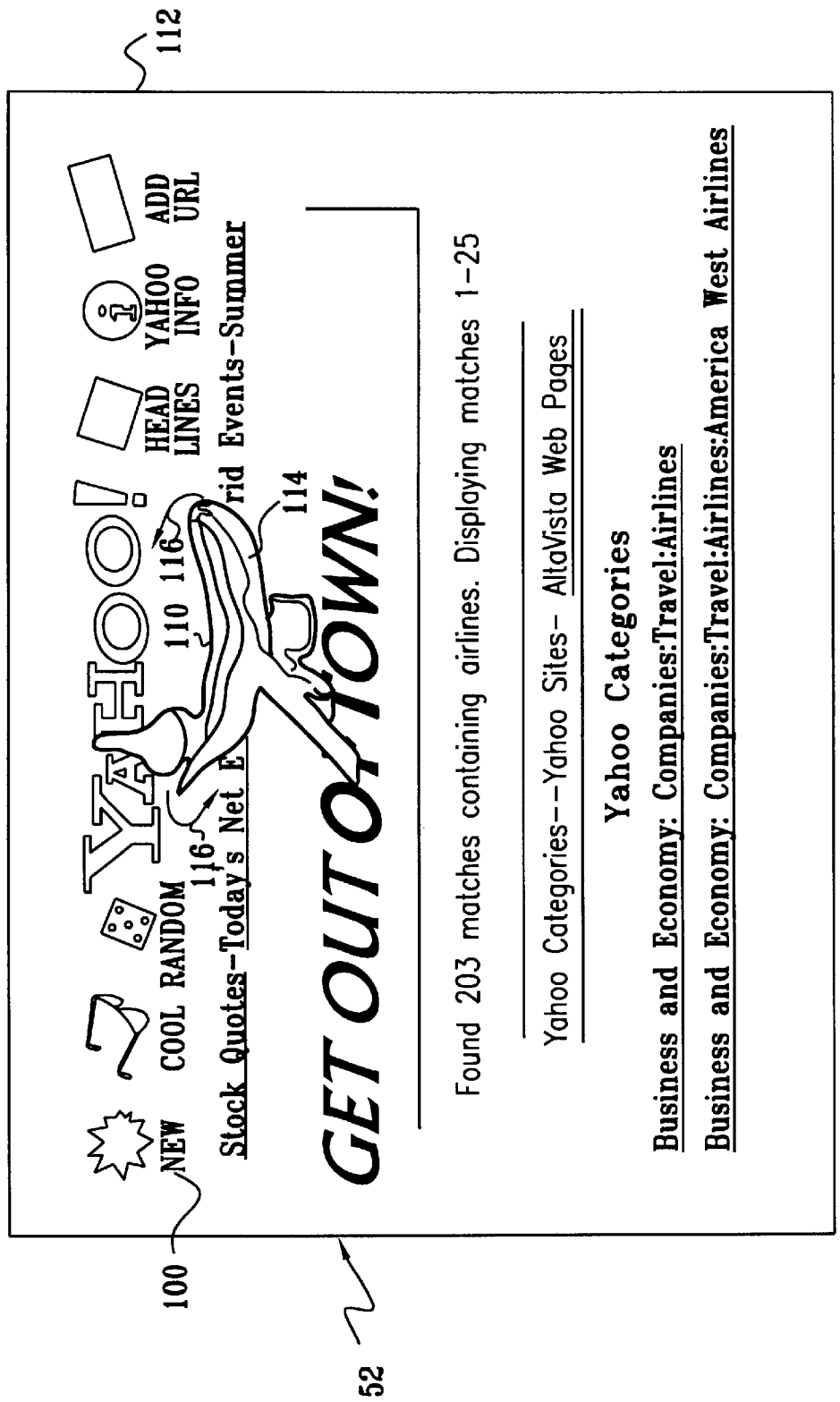
FIGS. 6A and 6B are graphic representations of an image element generated on a computer display screen by a 3D Smart Object, wherein the image element is overlaid on a display window generated by another software application, in accordance with a preferred embodiment of the present invention.
Figure 6B:
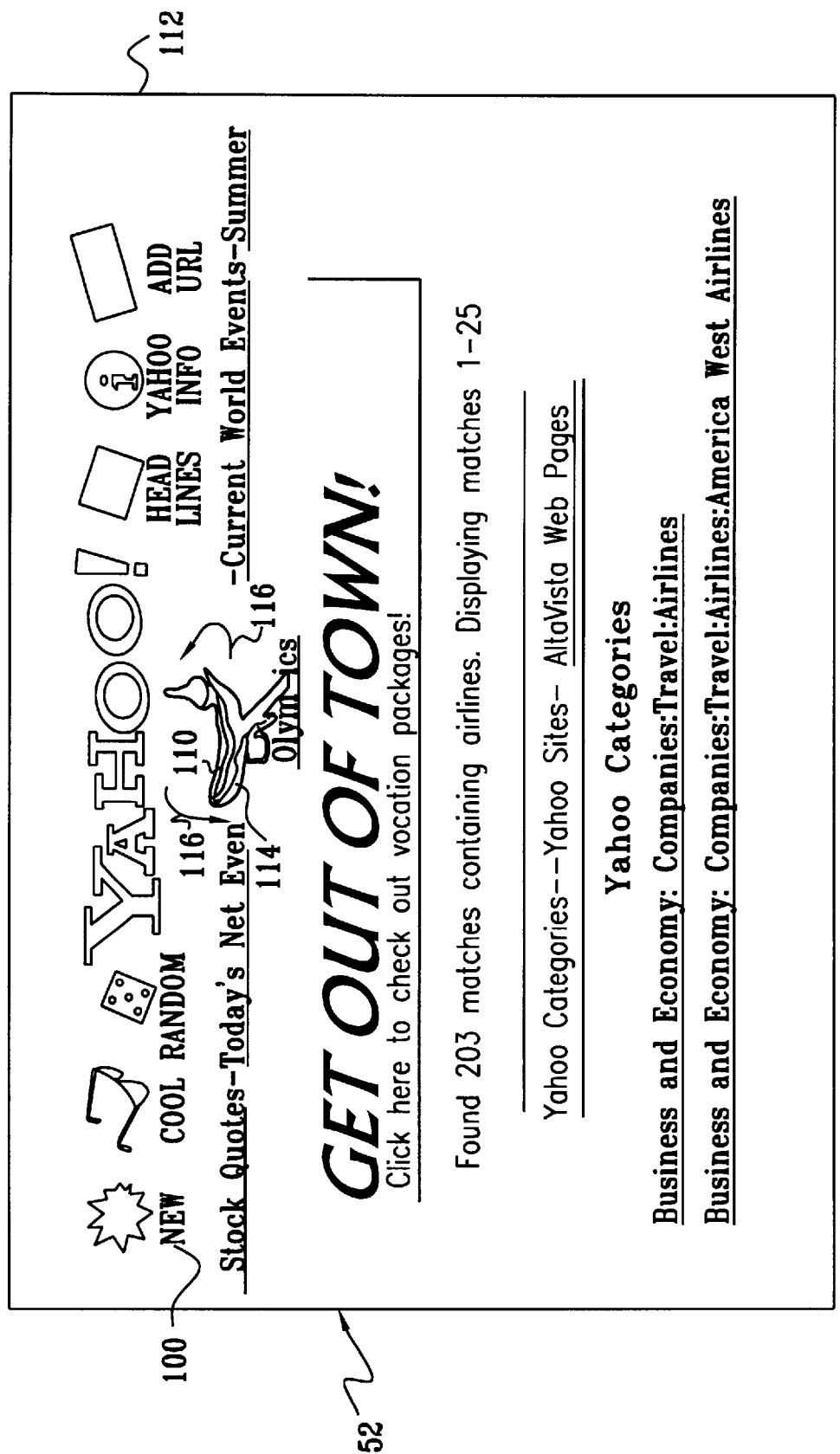

FIGS. 6A and 6B are graphic representations of computer screen 52, further exemplifying the principles of Transparent 3D graphic overlays, in accordance with a preferred embodiment of the present invention. In these figures, a 3D Smart Object corresponding to a circling airplane 110 is used to generate a Transparent 3D overlay image of the airplane, overlaid on an application window 112, for example, an Internet Web page. Airplane 110 circles continuously above window 112 along a 3D path indicated by arrows 116. It will be observed that as the airplane "flies" from its position in FIG. 6A to that in FIG. 6B, the shape of the airplane, as reflected by a border 114 circumscribing the airplane, changes responsive to the changing angle and perspective distance from which the airplane is seen. Yet the only part of text 100 in window 112 that is obscured is that which is directly behind the image of airplane 110, as defined by border 114.

Figure 7:
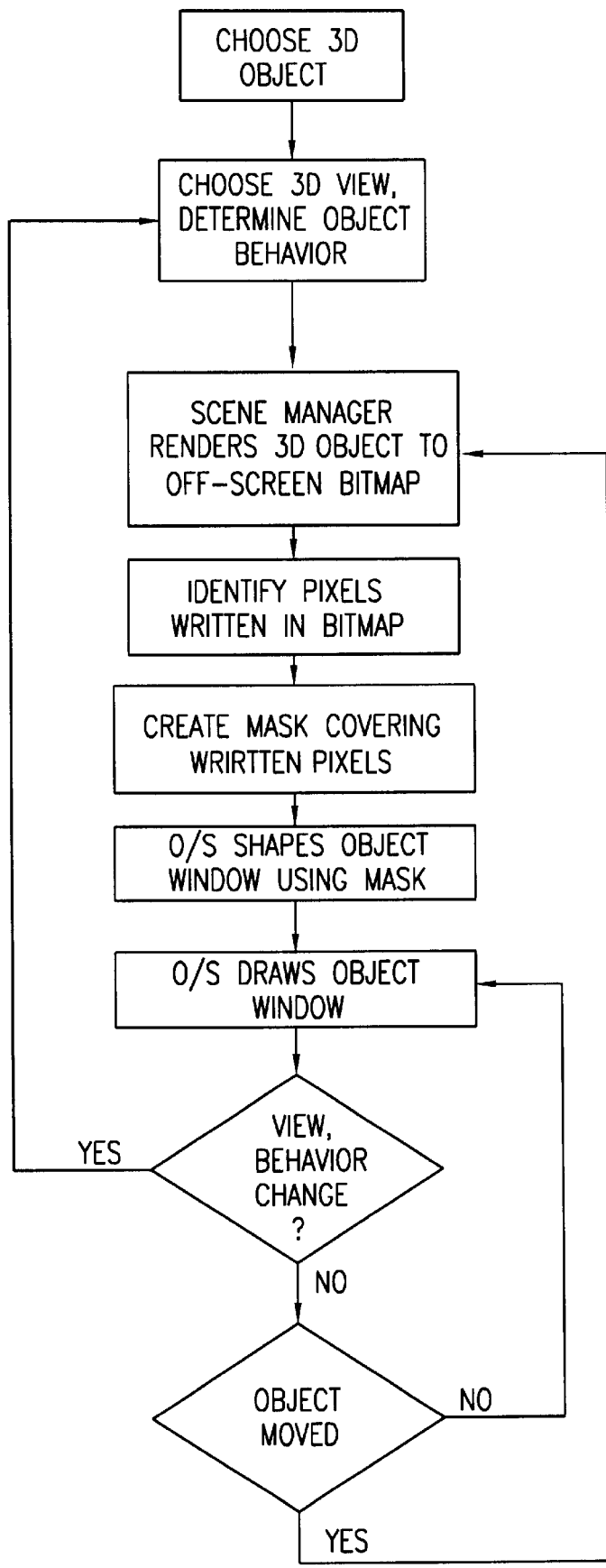
FIG. 7 is a flow chart illustrating a method of overlaying the image element on the display window of FIGS. 6A and 6B, in accordance with a preferred embodiment of the present invention.

FIG. 7 is a flow chart illustrating a method for creating Transparent 3D image overlays, in accordance with a preferred embodiment of the present invention. The method is based on the use of irregular-shaped, i.e., non-rectangular, windows on computer display screen 52, particularly as defined and supported by Microsoft Win32-type operating systems, such as Windows 95 and Windows NT 4.0. The method is also applicable, however, to computer animation systems using other operating systems that support irregular-shaped windows.

To create a Transparent 3D overlay, a 3D object is chosen, preferably a 3D Smart Object, such as that corresponding to airplane 110 in FIGS. 6A and 6B, as described above. The behavior, particularly the motion, of the object is determined, and a suitable 3D view, generally comprising a viewpoint and view angle, are chosen for rendering the object. A 3D rendering engine, for example, the rendering module of the Scene Manager, preferably using RenderWare software, as described above, renders an image of the object to an off-screen bitmap. Within this bitmap, the rendering engine or another software module identifies which pixels have been written to, i.e., which pixels are occupied by the image of the object, and which have not. This information is used to create a mask exactly covering the pixels that were written to, so as to delineate a border 114 of the image and a transparent area outside the border. The mask, surrounded by border 114, thus defines a window shape that exactly fits the image of the 3D object.

This window definition is passed to the operating system running on processor 44, and is used by the operating system to shape a window for the object that exactly fits border 114, making use of a capability of Win32 and other, similar operating systems of creating irregular-shaped windows. The operating system thus draws a window on screen 52 that contains the image, for example, the image of airplane 110. This window is overlaid above other windows on the screen, such as application window 112. Since the window containing airplane 110 exactly fits the shape of border 114, the remainder of application window 112 is substantially unobscured.

The shape and position of the window containing the image of the 3D object remain unchanged for as long as the object's behavior and position and the 3D view for rendering the image of the object do not change. In general, however, Transparent 3D image overlays comprise animated images, which do change, substantially continuously. Thus, as shown in FIG. 7, the Scene Manager checks regularly to determine whether the 3D view or the object's behavior has changed. For example, a sensitivity condition may have triggered a change in the behavior of a Smart Object, as described above with reference to FIG. 5. In such a case, a new 3D view and/or new object behavior is determined, and the process of drawing a suitably-shaped window for the new image of the 3D object is repeated. Similarly, if the 3D view and object behavior are unchanged, but the animated object is in motion, as shown, for example, in FIGS. 6A and 6B, then the window, containing the image of the object must be continually redrawn. In either case, a new image of the object is rendered to the off-screen bitmap, overwriting the previous bitmap, and the new bitmap is used in re-shaping the object window, as described above.

Whenever the shape and/or position of the object window changes, a different portion of application window 112 will be exposed. This newly-exposed portion of display 52 is quickly redrawn, in accordance with the application driving window 112. Throughout the process of drawing and displaying the Transparent 3D overlay image of airplane 110, the application of window 112 continues to run substantially uninterrupted.

Although sprite overlays are known in the art, as described above, none has been capable of 3D image overlays with real-time animation, and none has combined 3D image rendering with Win32-type irregular-shaped windows. Transparent 3D objects allow complete freedom of animation, based on manipulation of geometrical models, including arbitrary changes in the objects' motion, behavior and rendering. Animated image overlays known in the art use only pre-programmed animations, allowing very limited variations in the appearance of the overlay image.

Software File B comprises a program file entitled 3DTransparent.zip, in ZIP-compressed hexadecimal form, for creating Transparent 3D overlays in conjunction with Netscape "Navigator," in accordance with a preferred embodiment of the present invention. To run this program, as a plug-in to "Navigator," under the "Windows NT" operating system, 3DTransparent.zip is "unzipped" to a selected directory on the hard disk of a computer. The program uses the following RenderWare dll's, which must be copied to the system directory, for example, to c:\windows\system32: Rwdl6a20.dll, Rwdl6b20.dll, Rwdl6c20.dll, Rwdl6d20.dll and Rwl20.dll. A sub-directory entitled "Data" and the file npCrazySMarts.dll are copied from the selected directory, to which 3DTransparent.zip was unzipped to the "Program" sub-directory of the "Netscape" directory. Double-clicking on the file Crazy.html will activate a demonstration of a Transparent 3D overlay.

USER INTERFACE

Figure 8:
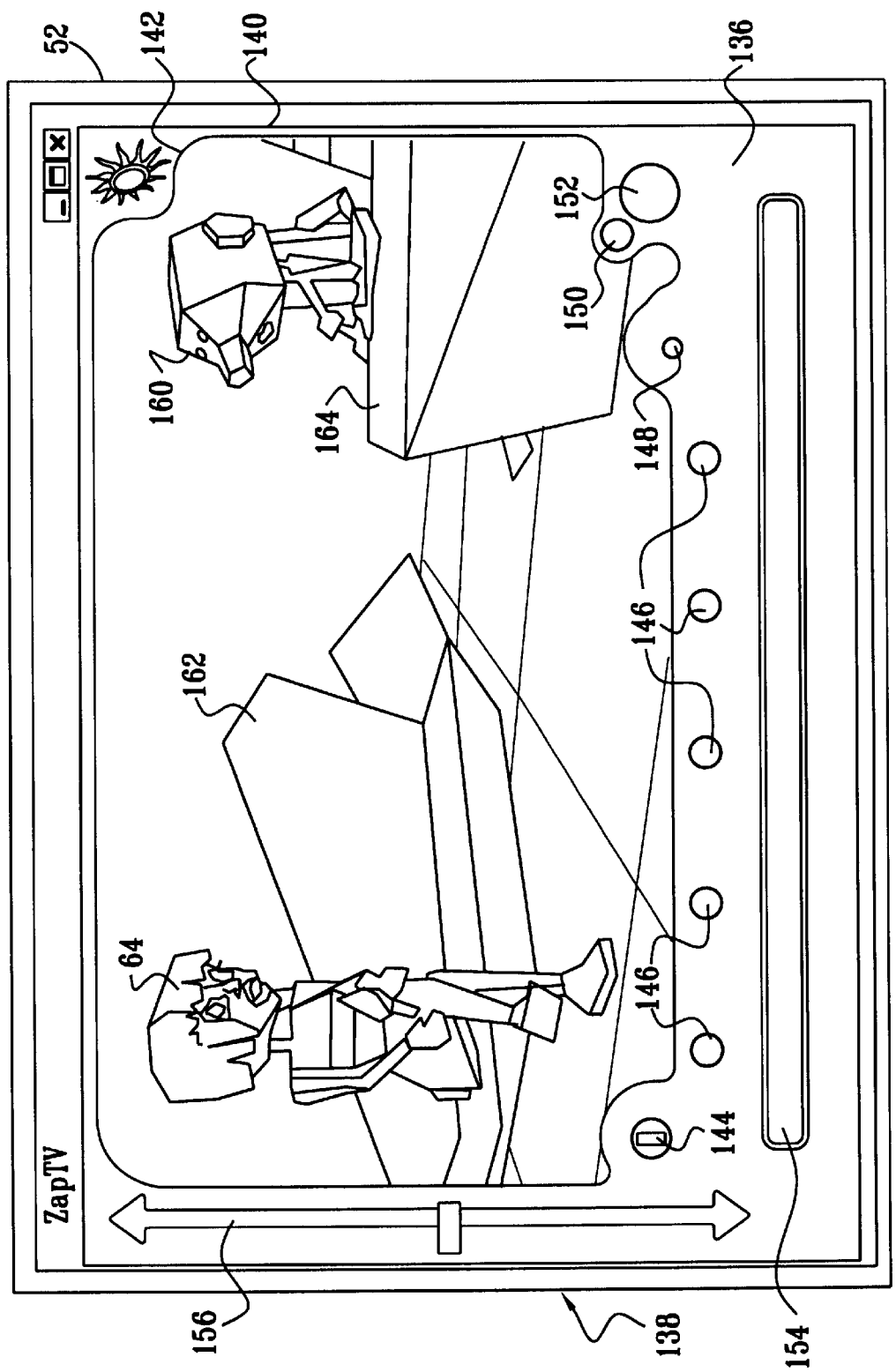
FIG. 8 is a graphic representation of a computer display screen illustrating elements of a graphic user interface presented in a window on the screen, in accordance with a preferred embodiment of the present invention.

Reference is now made to FIG. 8, which is a graphic representation of display 52, illustrating a computer animation application window 140, in accordance with a preferred embodiment of the present invention. Window 140 includes an animation area 142, which is contained within a frame 136 including graphic user interface controls 138. A computer animation sequence is displayed in animation area 142, including female character 64 and a host character 160, which preferably correspond to respective 3D Smart Objects. The sequence from which FIG. 8 is taken represents a television "talk show," wherein host 160 "interviews" character 64, based on a script and on the appropriate behaviors of the associated Smart Objects, as described above. The script of the talk show appears, line by line, in a dubbing strip 154, while characters 64 and 160 are also seen and can preferably also be heard to speak their appropriate lines.

Frame 136 preferably comprises a 3D still image, having a transparent region defining animation area 142. As shown in FIG. 8, the transparent region is preferably non-rectangular. Frame 136 is rendered as an overlay, above animation area 142, so that the animation is seen on display 52 inside a correspondingly non-rectangular "window," defined by the frame. The irregular shape of the animation area adds interest to the scene, and also serves to emphasize the functionality of user controls 138 in relation to the scene. Using this method, animation area 142 may be given any desired shape, and frame 136 may comprise any suitable still image. For example, the frame may have the appearance of an auditorium, and the animation area may be shaped as a stage.

User interface controls 138 include an on-screen joystick 144, slider 156, selector push buttons 146, a start button 152, pause button 150, and user response button 148. These controls are used primarily to control the operation of virtual "cameras," defining the 3D view from which the scene in animation area 142 is rendered, as described in greater detail below. User controls 138 are preferably themselves 3D graphic objects, which are rendered as part of the image of frame 136. Thus, the sizes and shapes of the user controls and the distances between them may be altered as desired to enhance their functionality and ease of use.

Figure 9A:
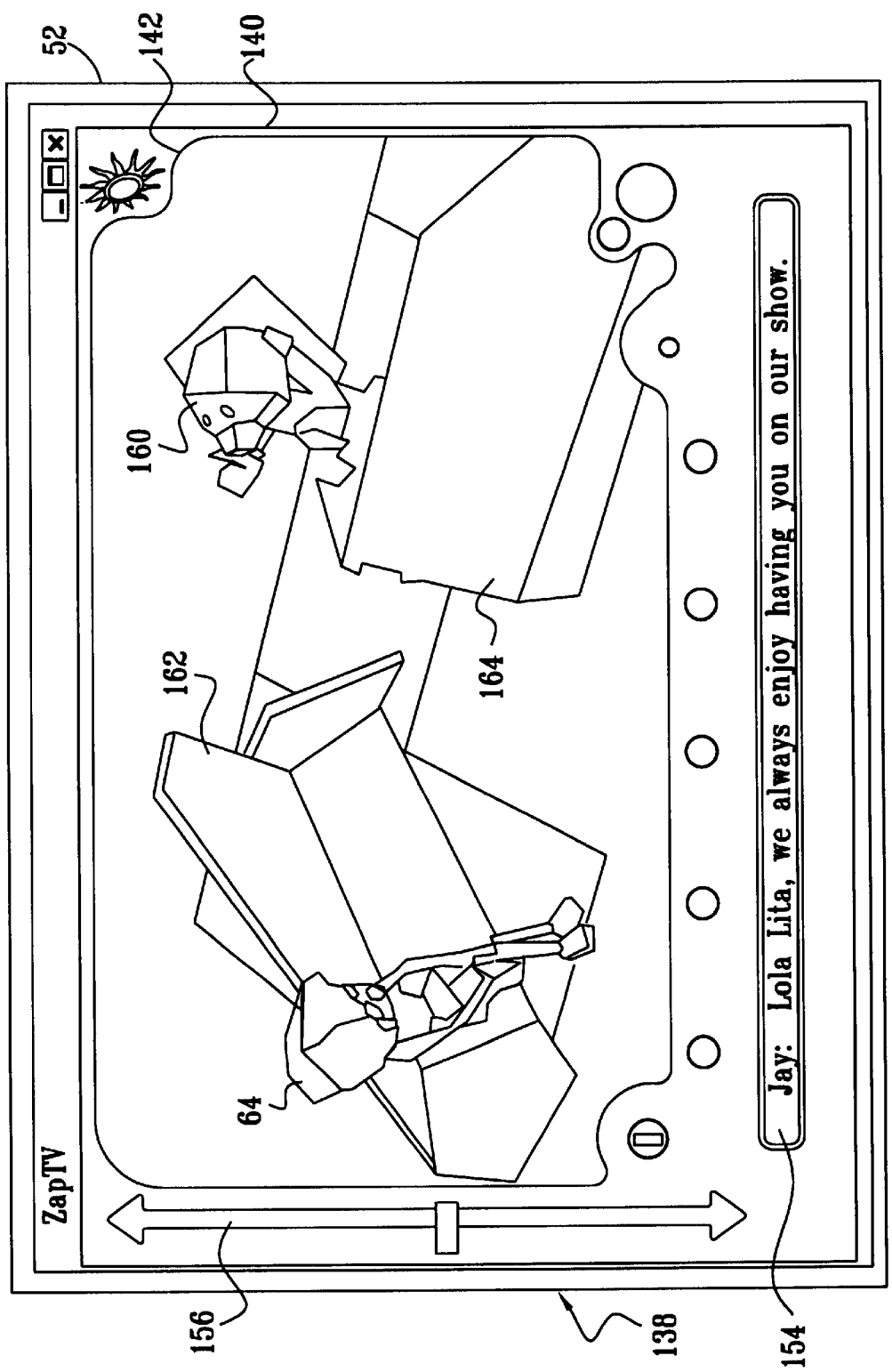
FIGS. 9A and 9B are graphic representations of the computer display screen of FIG. 8, showing changes in the shapes and sizes of elements of the graphic user interface as the size and shape of the window are varied, in accordance with a preferred embodiment of the present invention.
Figure 9B:
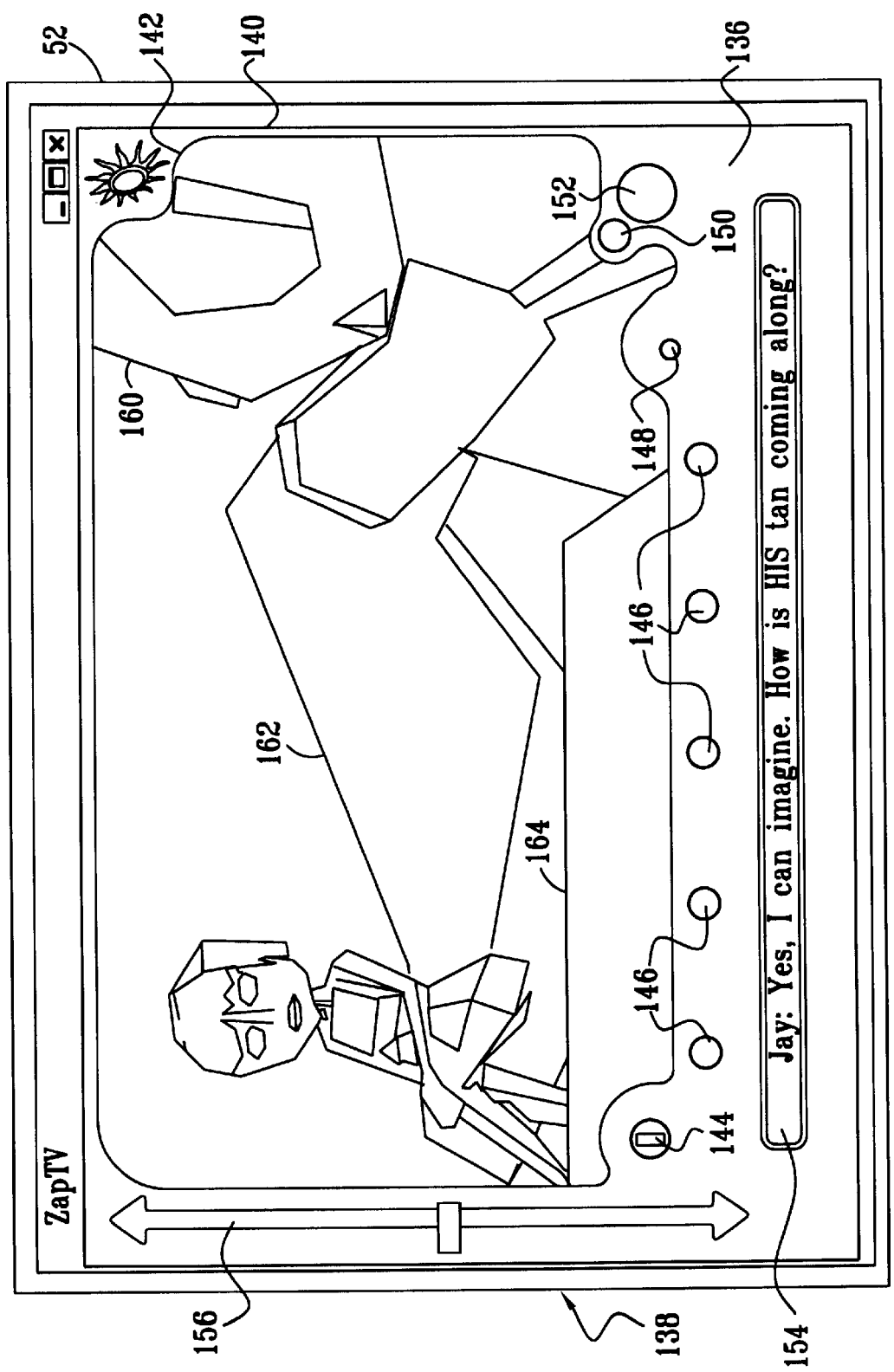

FIGS. 9A and 9B are graphic representations of display 52, illustrating changes in the sizes and spacing of user controls 138, responsive to scaling of animation application window 140, in accordance with a preferred embodiment of the present invention. In FIG. 9A, window 140 has been scaled down vertically. In consequence, the height of slider 156 is reduced to fit the window dimension. Similarly, in FIG. 9B, the width of window 140 is reduced, and the spaces between push-buttons 146 are concomitantly narrowed. Dubbing strip 154 is narrowed at the same time.

The variable sizes and spacing of user controls 138 in FIGS. 8, 9A and 9B enable a user to operate the controls by means of pointing device 50 with greater ease and accuracy. The variations in size and spacing of the controls also give window 140 a more pleasing aesthetic appearance. By contrast, graphic user interface controls known in the art generally have fixed sizes and spacings, regardless of the scaling of the window in which the controls are contained.

Figure 10A:
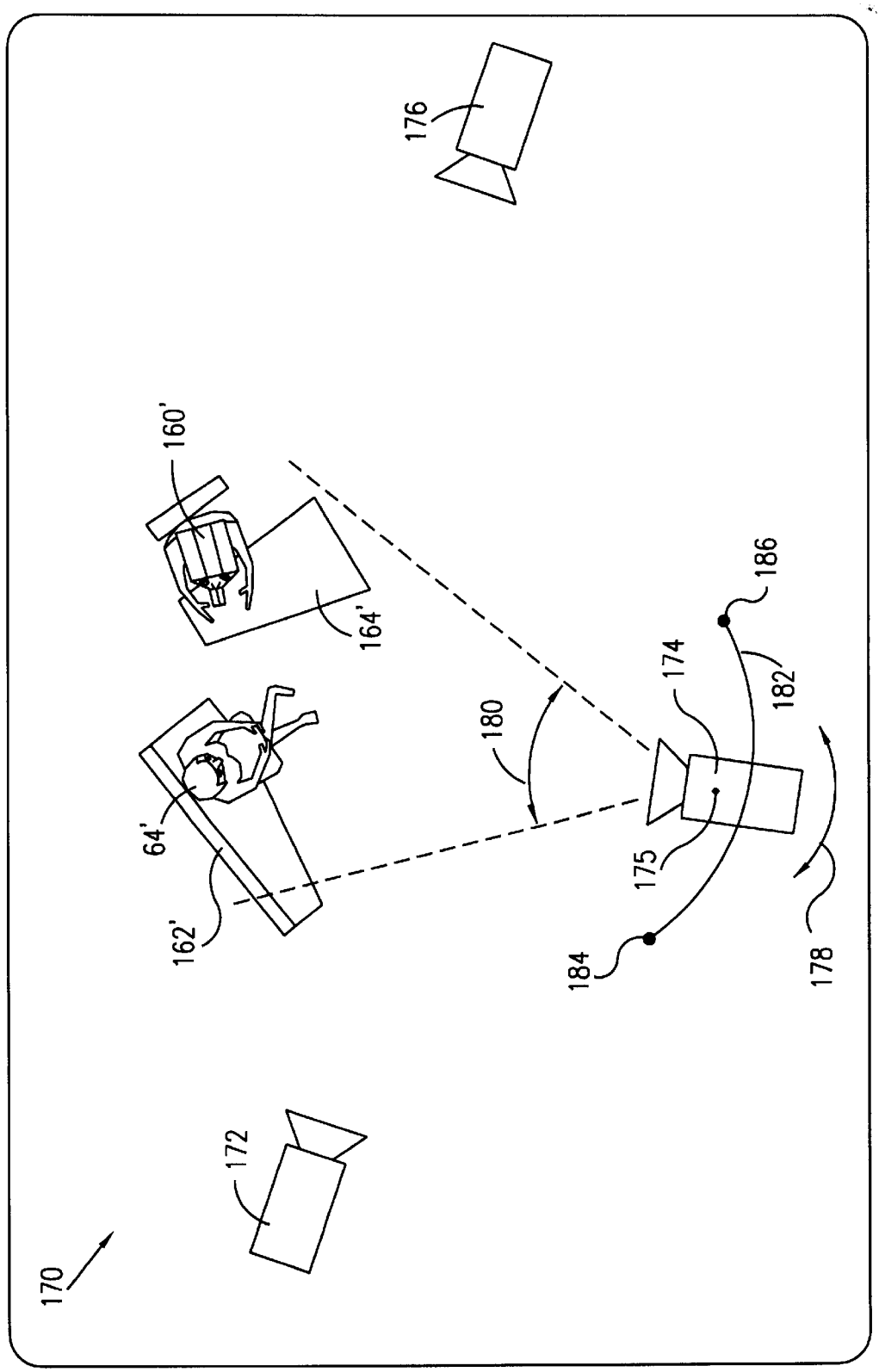
FIGS. 10A and 10B are schematic illustrations of a computer animation scene, useful in understanding the operation of virtual cameras for rendering computer animation sequences from different viewpoints, in accordance with a preferred embodiment of the present invention.
Figure 10B:
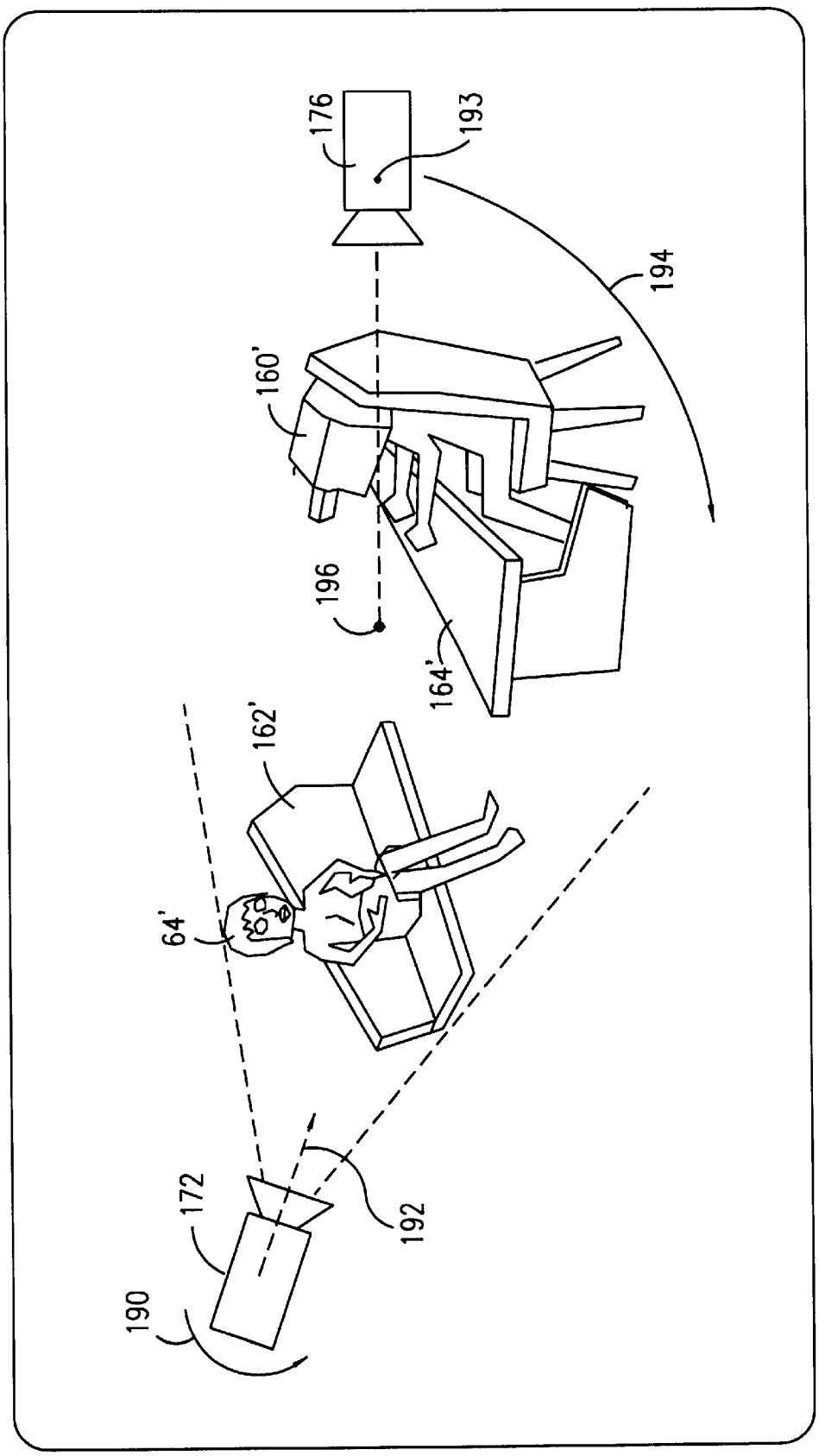

FIGS. 10A and 10B are schematic diagrams showing the positions of 3D objects in a 3D animated scene 170, and illustrating the operation of virtual cameras 172, 174 and 176 in rendering the scene to image area 142 of display 52 (shown in FIG. 8), in accordance with a preferred embodiment of the present invention. FIG. 10A is a top view of scene 170, and FIG. 10B is a side view. The 3D objects comprise Smart Objects 64' and 160', which are rendered respectively as images of characters 64 and 160 in image area 142, and furniture objects 162' and 164', rendered respectively as couch 162 and table 164 in the image.

Each of virtual cameras 172, 174 and 176 corresponds to and defines a 3D view of scene 170. Each camera is selected by pressing an appropriate one of push buttons 146. In a preferred embodiment of the present invention, five virtual cameras are used, corresponding to the five selection buttons 146, but for simplicity of illustration, only three cameras 172, 174 and 176 are shown in FIG. 10A, and only two of the cameras are shown in FIG. 10B. Thus, the view rendered in FIG. 8 corresponds generally to that seen by camera 176.

As illustrated in FIGS. 10A and 10B, each of cameras 172, 174 and 176 is capable of a range of virtual motions, changing the cameras' viewpoints (spatial positions), zoom angles and orientations. For example, as shown in FIG. 10A, camera 174 may be panned about its viewpoint 175, as indicated by an arrow 178. The camera's zoom angle, indicated by an arrow 180, may be varied between wide-angle and close-up views. The zoom is preferably controlled by shifting slider 156.

Camera 174 may also be moved along a straight or curved path in space, as shown, for example, by an arrow 182, indicating that the camera is translating from a starting point 184 to an end point 186. Preferably, these paths are predefined, to give a well-controlled range of camera positions, analogous to movement of real video cameras in an actual television studio. When camera 174 is selected, a user initiates motion of the camera along the path indicated by arrow 182 by pressing start button 152. To stop the camera's motion, the user presses pause button 150.

Other camera motions are illustrated in FIG. 10B. For example, camera 172 tilts up and down about its viewpoint 195, as indicated by an arrow 190. A point in space may be chosen, such as a point 196, and camera 176 may be controlled to revolve about the point in an orbit beginning at a position 193, for example, and continuing as indicated by an arrow 194. The cameras' tilt, pan and revolution are preferably controlled using joystick 144, as is further described below. Likewise, camera 172 may be made to close in toward point 196, along a linear path indicated by an arrow 192, and may similarly be made to pull out, away from scene 170, along an opposite path. Point 196 may be chosen to be anywhere in the 3D space of scene 170, including in or adjacent to one of the objects in the scene.

It will be understood that although certain of these camera motions are described herein with reference to a specific one of cameras 172, 174 and 176, the motions may be applied equally to all of the cameras, as well as to additional virtual cameras, not shown in the figures, which may be provided.

Figure 11A:
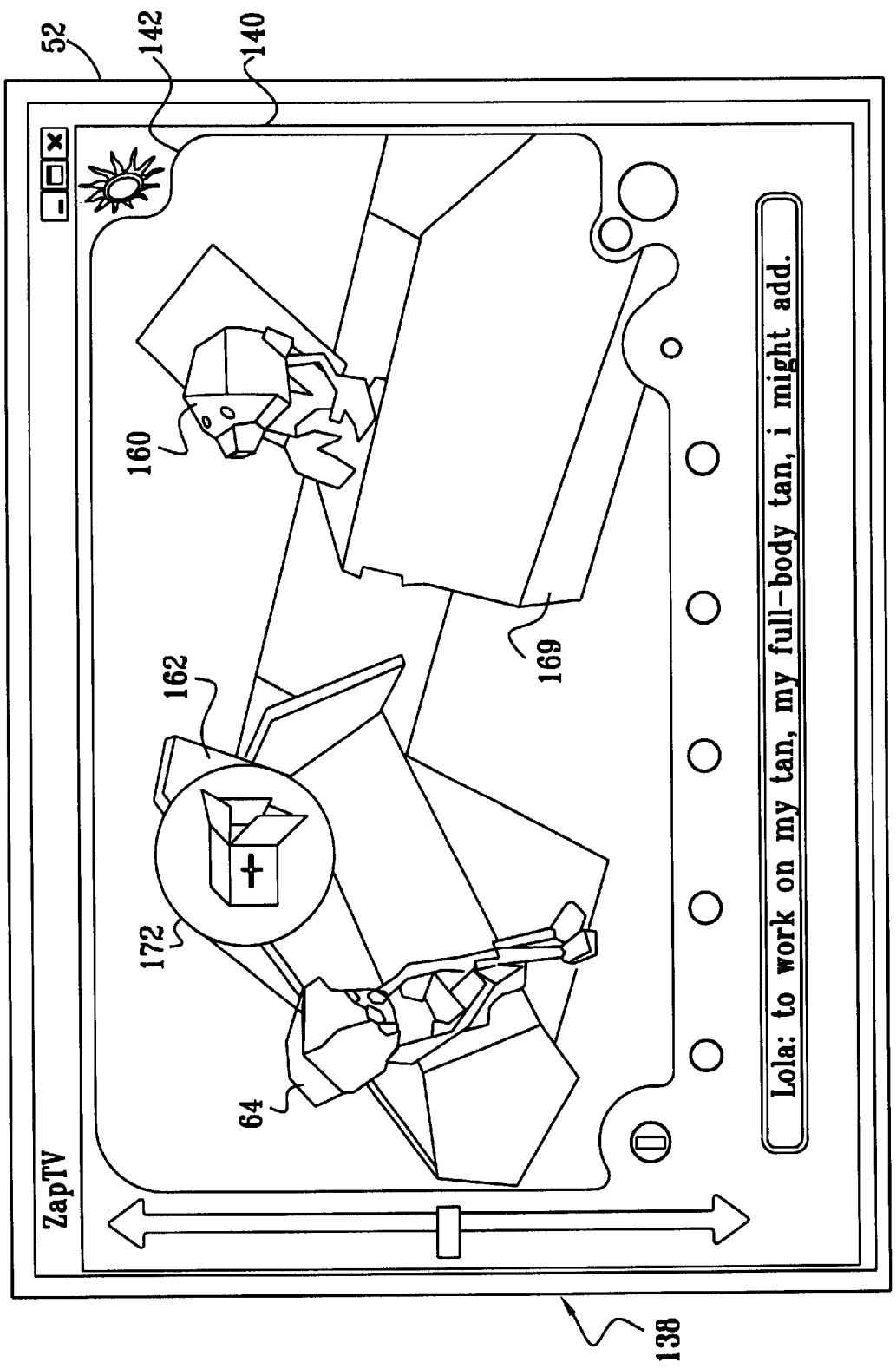
FIGS. 11A and 11B are graphic representations of the computer display screen of FIG. 8, showing changes in rendering of the scene responsive to selection and movement of the virtual cameras of FIGS. 10A and 10B, in accordance with a preferred embodiment of the present invention.
Figure 11B:
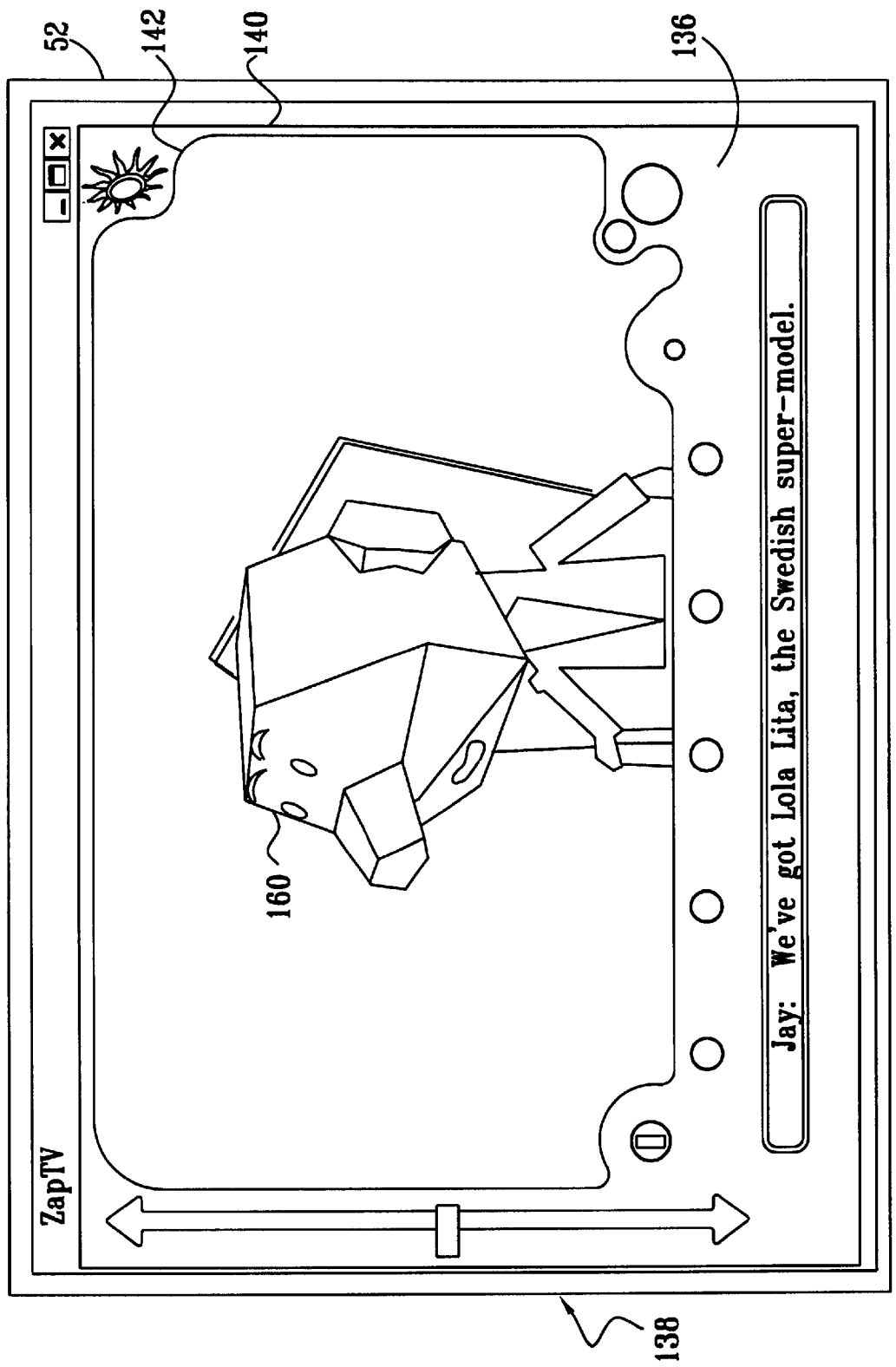

FIGS. 11A and 11B are graphic representations of display 52, illustrating the effects of the camera motions and camera selection described above on images rendered in image area 142. FIG. 11A shows a view corresponding to camera 174, whose general position and zoom angle are shown schematically in FIG. 10A.

FIG. 11A also includes a schematic, outline representation of camera 172, superimposed on the animated scene. Ordinarily, this representation of the camera is not shown in the animated image area. The user may choose to display the camera outline, however, to assist in visualizing and shifting the camera's coordinates. FIG. 11B shows a view "captured" by camera 172 in the position shown in FIG. 11A, i.e., FIG. 11B shows the view of camera 172, after the camera has closed in toward point 196 (FIG. 10B), as described above.

It will be appreciated that the user interface described above, comprising on-screen controls 138 and virtual cameras 172, 174 and 176, allows a user of computer animation system 40 to choose and manipulate the viewpoints from which scene 170 is rendered with substantial precision and flexibility and with relative ease. In interactive computer animation systems known in the art, a user is generally limited either to a fixed viewpoint, giving relatively little flexibility, or must maneuver a virtual camera by "free navigation" in 3D space. Free navigation is difficult to control, since pointing devices and on-screen controls typically have only two degrees of freedom, while the virtual camera has three. In accordance with the principles of the present invention, however, navigation in 3D space is based on selection from among predefined viewpoints, on zoom, pan and tilt angles centered on these viewpoints, and on movement of the viewpoints along predetermined, linear and arcuate paths. The viewpoints and paths are preferably pre-programmed and supplied to a user as part of an animation software package. Alternatively or additionally, the user may independently designate viewpoints and paths, preferably using pointing device 50 (FIG. 1).

Figure 12:
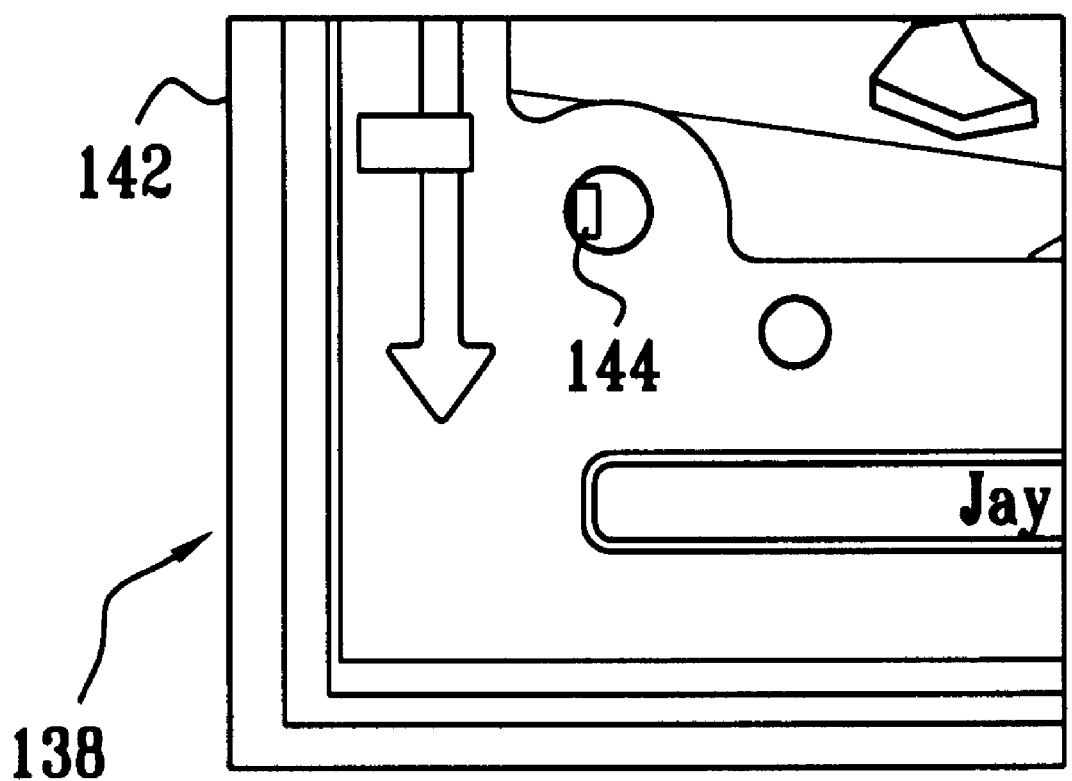
FIG. 12 is a graphic representation of a 3D joystick, shown on the computer display screen of FIG. 8, for use in controlling the operation of the virtual cameras of FIGS. 10A and 10B.

FIG. 12 is a graphic representation showing a portion of display 52, illustrating the operation of on-screen joystick 144. The joystick is operated by selecting it, preferably using pointing device 50, and then dragging it in a desired direction by a desired amount. In FIG. 12, joystick 144 has been dragged to the left.

Joystick 144 has two alternative functions: Either pan and tilt of one of the virtual cameras that has been selected, or revolution of the selected camera about a point in scene 170. When the joystick is used to control camera revolution, left-right movement of the joystick drives the revolution in a horizontal plane, while up-down movement drives the revolution in a vertical plane. Preferably, user response button 148 is used to toggle between the tilt/pan and revolutionary movements of the selected camera.

Software File D comprises a computer animation program using 3D Smart Objects, in ZIP-compressed hexadecimal form, illustrating aspects of the graphic user interface software described above, in accordance with a preferred embodiment of the present invention. The program operates under the "Windows 95" operating system. To run the program, the file ZapTV.zip is "unzipped" into the main directory on the hard disk of a computer. The following Windows 95 dll is copied to this directory: Msvcrt.dll, together with the following RenderWare dll's: Rwdl6a20.dll, Rwdl6b20.dll, Rwdl6c.dll, Rwdl6d20.dll and Rwl20.dll. When the program AUDITORIUM.EXE is run, operation of the user interface is demonstrated, along with other aspects of 3D Smart Objects, described herein.

ASSOCIATIVE VISUAL SEARCH

Figure 13A:
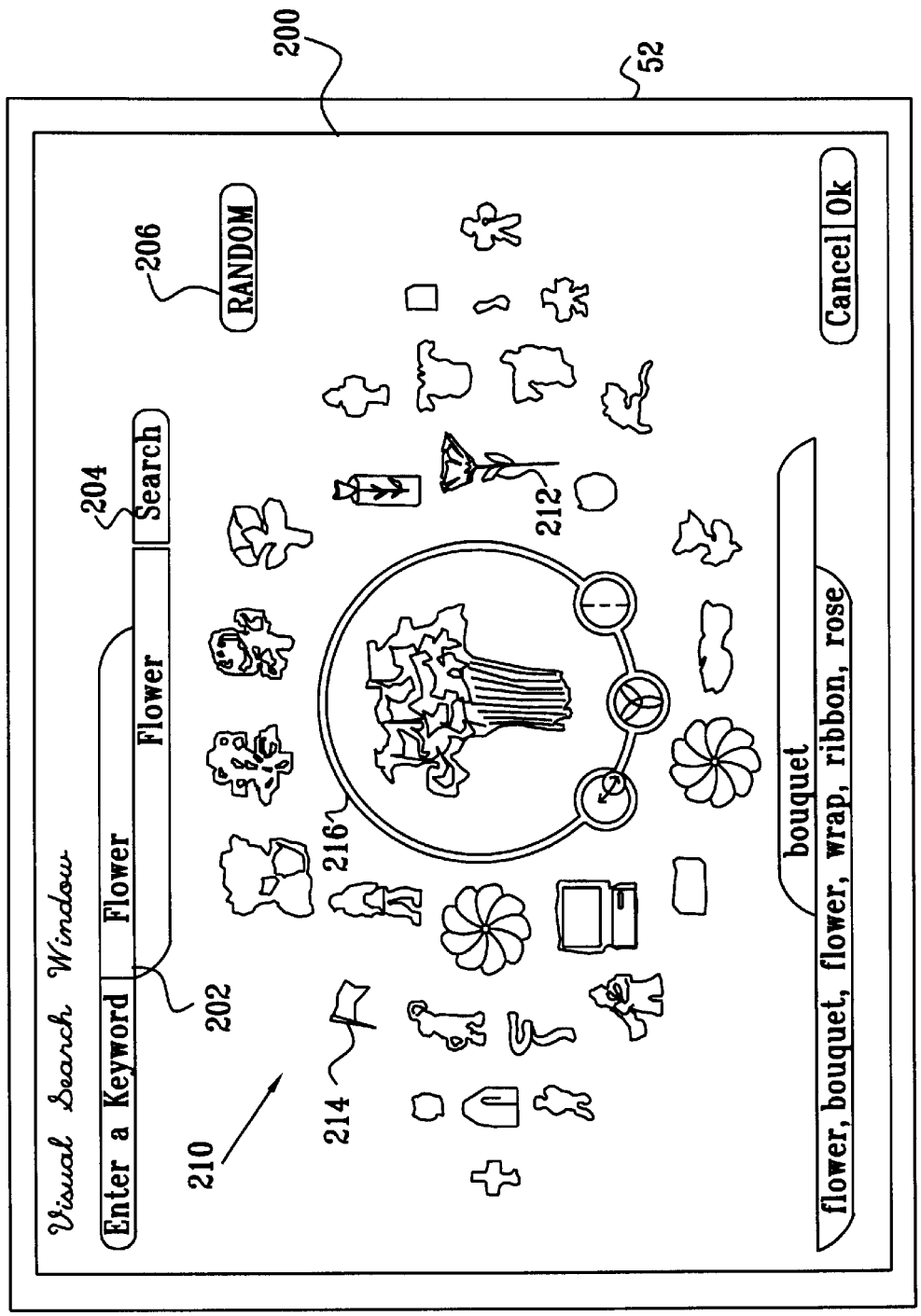
FIGS. 13A and 13B are graphic representation of a computer display screen, illustrating a graphic user interface used in conjunction with an associative visual search engine, in accordance with a preferred embodiment of the present invention.
Figure 13B:
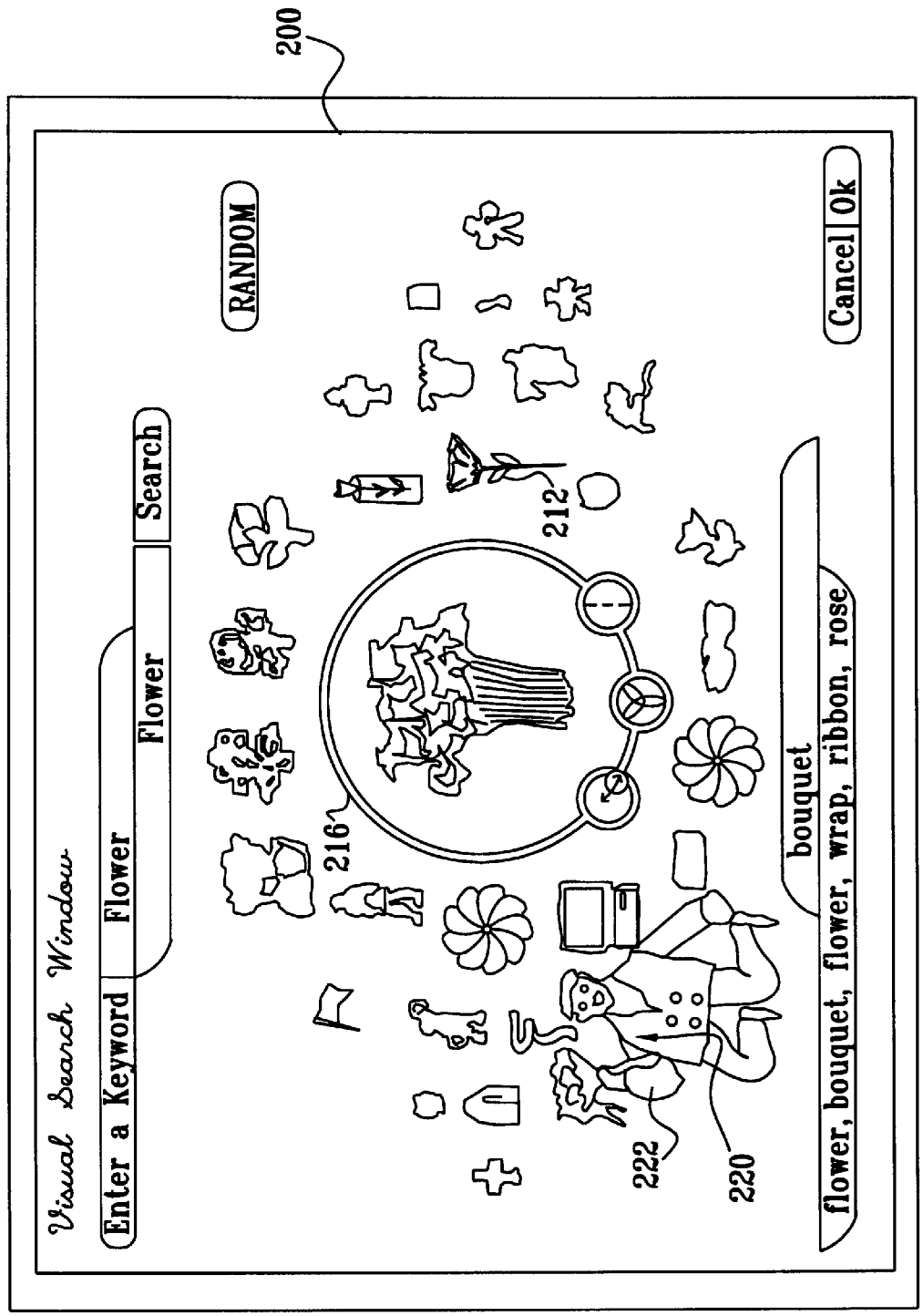

FIGS. 13A and 13B are graphic representations of display 52, schematically illustrating a user interface window 200 associated with a visual search engine, in accordance with a preferred embodiment of the present invention. The search engine is preferably used to search through a library of animations and/or animated objects, most preferably, 3D Smart Objects, and it is particularly useful in creating computer animations. But it may, alternatively or additionally, be used in searching through databases of still images, particularly including background and border images for use in creating computer animations.

Figure 14:
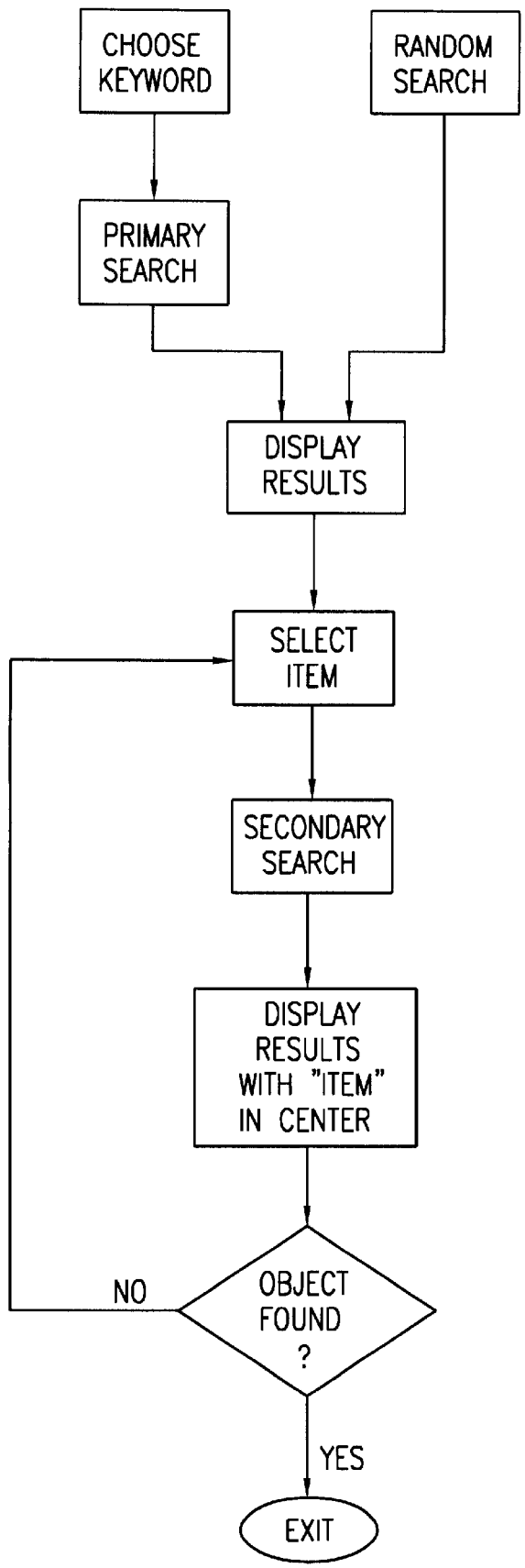
FIG. 14 is a flow chart illustrating the operation of the visual search engine whose user interface is shown in FIGS. 13A and 13B, in accordance with a preferred embodiment of the present invention.

FIG. 14 is a flow chart, illustrating a method of operation of the visual search engine, in accordance with a preferred embodiment of the present invention.

Each item in the library or database to be searched must have at least one, and preferably a plurality, of keywords associated therewith. The keywords preferably describe different aspects of the item, such as its name and type, subject matter, character, appearance, style, color, size, etc. The keywords for each item are hierarchically ranked, with one of the keywords chosen to be the premier keyword for the item. Preferably, each item also has a unique name by which it is identified.

As shown in FIG. 13A, to begin a search, a user preferably enters a starting keyword or name in an entry field 202 in window 200, and then selects a "search" button 204. Based on the starting keyword or name, a primary search is conducted of the library or database. The search engine finds keywords or names associated with items in the library that match the keyword that is entered, and displays the matching keywords or names in a match field 218. Preferably, the search engine includes a thesaurus, which enables the engine to select and search for other keywords synonymous with the starting keyword, particularly when the starting keyword is not found among the keywords of the library or database.

Once the primary search is complete, the results are displayed in an image area 210 of window 200. An image of an item, in this case a bouquet 208, that most closely matched the starting keyword is displayed in a central portion 216 of the image area. Images of other items that matched the starting keyword are also displayed within area 210, in a generally concentric arrangement around central portion 216. Images of items that matched the starting keyword more closely, such as an image of a flower 212, are displayed in closest proximity to central portion 216, while those that matched less closely, such as a banner 214, are displayed farther away.

In the context of the present patent application and the claims, an item is considered to match closely a keyword that is searched for when the keyword searched for occupies a high rank in the hierarchy of keywords associated with the item. Generally, the higher the rank of the keyword searched for is in the hierarchy, the closer is the match. It will be appreciated, however, that in other preferred embodiments of the present invention, the principles of the search engine described herein and particularly the graphic user interface associated therewith, as exemplified by window 200, may be applied using other search algorithms known in the art.

Alternatively, the user may begin a search by selecting a "random" button 206. In this case, the search engine performs a random search through the database or library and presents a random assortment of images in window 200. This random search feature is useful when the user wishes to browse through the library or database so as to intuitively seek associations, rather than using the more directed keyword search.

Once the primary search or random search has been performed, the user visually reviews the images in window 200. Preferably, as shown in FIG. 13B, when the user points to one of the images 222 with a cursor 220 (without necessarily selecting the image), the image, in this case a man with a bouquet, is enlarged. If image 222 represents an animated object, then when the user points to the image, an animation associated therewith is run. Similarly, if image 222 represents a 3D object, then the enlarged image is preferably rendered as a 3D image.

It will thus be appreciated that the properties of the search engine exemplified by FIG. 13B make it particularly useful for searching through a library of Smart Objects, and most preferably 3D Smart Objects. On the other hand, it will also be understood that the unique aspects of the search engine and the user interface associated therewith will be useful for searching through other image libraries and databases, as well.

Returning to the flow chart in FIG. 14, after the primary or random search results are displayed, the user selects an item shown in image area 210, for example, image 222, preferably by "clicking on" the item using pointing device 50. The selected item is displayed in central portion 216 of window 200, instead of the image that was displayed there previously. The search engine conducts a secondary search, preferably based on the principles of keyword matching described above in reference to the primary search. Since the item associated with image 222 will generally have a different set of keywords from that used in the primary search, the secondary search will find new items in the library or database. The new items are displayed in image area 210 in the same concentric arrangement as described above.

The user reviews the new items found in the secondary search. If the user finds a desired item, for example, an object to be used in an animation, that item is selected, and the search ends. If the desired item is not found, the user preferably selects a new one of the items in image area 210 that has some association with a type of item or concept that the user has in mind. This new item then serves as the starting point for another search, like the secondary search described above. This iterative cycle of association (by the user) and search (by the search engine) may be repeated indefinitely until the desired item is found. It will be appreciated that an associative search of this sort is useful both for finding a specific item or type of item in a library or database and for browsing through the library or database in search of a new, as-yet-unformulated idea.

TRANSMITTING ANIMATION OVER A NETWORK

Figure 15:
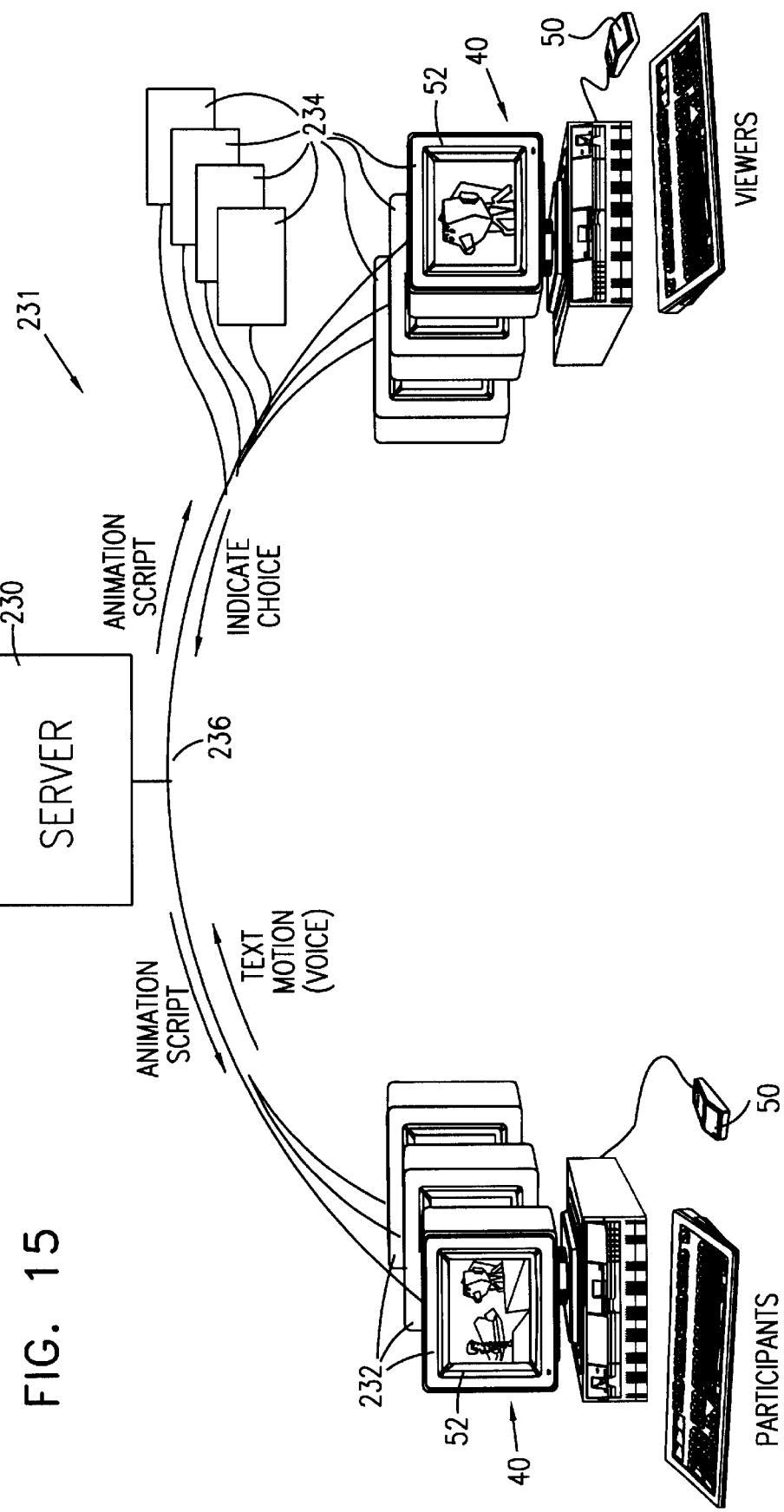
FIG. 15 is a block diagram illustrating a system architecture for transmission of a computer animation program over a computer network, in accordance with a preferred embodiment of the present invention.

Reference is now made to FIG. 15, which is a block diagram illustrating a system architecture 231 for transmission of an interactive computer animation over a computer network 236, preferably over the Internet, in accordance with a preferred embodiment of the present invention. The animation, for example, a talk show, as described above with reference to FIG. 8, is produced by a server 230 and is distributed over network 236 to multiple clients 232 and 234. The clients include viewers 234, who use computers such as computer 40, shown in FIG. 1, to receive the animation from the server and view the animation on local display 52. The clients may also include participants 232, who not only view the animation, but also participate in the animation, for example, by controlling respective avatars in the talk show. Preferably, the animation is based on Smart Objects, most Preferably 3D Smart Objects, as described above.

For the sake of clarity of explanation, the following description of FIG. 15 assumes that the animation transmitted over network 236 comprises a talk show, as illustrated and described above. It will be appreciated, however, that the principles of the present invention, as described with reference to the talk show, may similarly be applied to transmit other types of animated information, entertainment and advertising programs over a network. Thus, the animation may comprise, for example, a game show, a soap opera, or an interactive shopping program, which are preferably realized using Smart Objects.

In order to transmit the talk show of FIG. 8 to one of viewers 234, the Smart Objects representing female character 64 and host 160 are transmitted by server 230 over network 236 and are preferably stored in local memory 46 of the viewer's computer 40. The Smart Objects need be transmitted only once. In fact, assuming host 160 appears in a series of talk show programs transmitted by server 230, the host Smart Object may be recalled from local memory and need not be retransmitted over the network for each new talk show transmission.

As a result of this use of Smart Objects in the show, the time and bandwidth needed to transmit each show over network 236 is substantially reduced. All that is necessary is to transmit an animation script. The animated Smart Objects speak their lines and move between appropriate, predetermined positions within an animation scene, such as scene 170 shown in FIGS. 10A and 10B, in accordance with the script. On account of the substantial autonomy of the Smart Objects, substantial portions of the appearance, gestures and expressions of the characters are filled in by the Smart Objects themselves, and need not be transmitted over the network. The animated talk show is rendered to display 52 by a rendering engine running on computer 40, as described above.

Preferably, the Smart Objects and the animation script are compatible with animation interchange tools and conventions known in the art, most preferably with VRML 2.0, as described above. Such compatibility allows viewers 234 to receive and view animations using commonly-available Internet browsing software, with suitable animation plug-ins, as are known in the art.

Further preferably, viewers 234 are provided with user interface controls, such as on-screen controls 138 shown in FIG. 8. As described above, controls 138 are used to vary the selection and viewpoints of virtual cameras 172, 174 and 176 (FIGS. 10A and 10B), so that the viewer may, for example, choose between the wide angle view of FIG. 11A and the close-up of FIG. 11B. User controls may also be provided to change other aspects of the animation, such as lighting or background.

Viewers 234 have only limited opportunity, however, to interact with and affect the animation script. Such interaction is typically limited to indicating a selection which may be transmitted back to the server, for example, answering a multiple choice question put to them by host 160 of the talk show, by "clicking on" user response button 148.

Participants 232 are clients of server 230 who are given a more active role in the animation. For example, the participants may control respective Smart Object characters appearing in the talk show, wherein the Smart Objects preferably comprise the participants' respective avatars. Each participant 232 preferably inputs text, along with a suitable animation from the set of animations belonging to the participant's respective Smart Object. The text and animation are conveyed over network 236 to server 230 and sent out to viewers 234. Participants 232 may further control their avatars' motions, preferably using a pointing device, such as pointing device 50 (FIG. 1), or by other means known in the art.

The local computer hardware and animation rendering software required by participant clients 232 and by viewer clients 234 are substantially the same. Participants 232 generally have additional software enabling them to participate in the animation. A further feature of animation programs transmitted over network 236 by server 230 is that one or more of viewers 234 may be invited to become participants in such a program.

Figure 16:
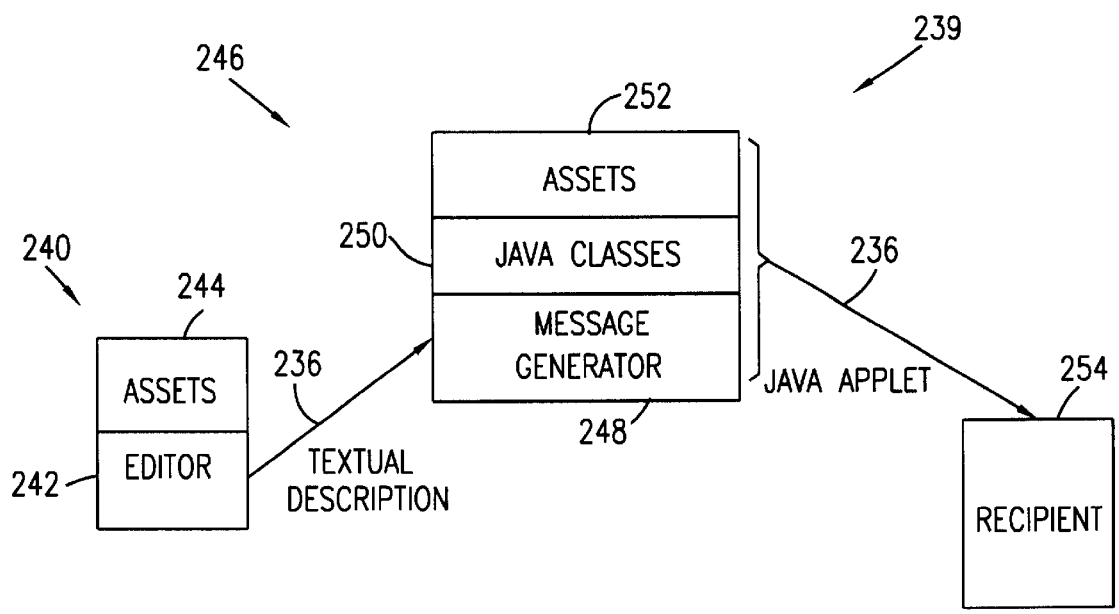
FIG. 16 is a block diagram illustrating a system architecture for transmission of an animated message over a computer network, in accordance with another preferred embodiment of the present invention.

FIG. 16 is a block diagram illustrating another system architecture 239 for transmission of computer animations over network 236, in accordance with another preferred embodiment of the present invention. System architecture 239 includes a network server 246, which is connected via network 236 to a source client 240 and a recipient client 254. The system is used by source client 240 to prepare an animation, for example, an animated message as described below, and send the animation in the form of electronic mail to recipient 254 for viewing.

In the preferred embodiment illustrated by FIG. 16, the animation is prepared at source 240 and sent to recipient 254 using conventions that are well known in the art. Source 240 and recipient 254 are preferably equipped with computers 40 as shown in FIG. 1, or with similar equipment. Preferably, as shown in FIG. 16, the animation sent to recipient 254 is based on the JAVA language and HTML file format. It will be appreciated that the principles of the present invention, as exemplified by FIG. 16 and described with reference thereto, may similarly be applied to prepare and transmit electronic mail that includes 3D animations, using VRML, for example.

Source client 240 uses a message editor 242 and assets 244, comprising a library of animation elements, as described below, to prepare an animated message for recipient 254. The message is conveyed to server 246 via network 236, addressed to recipient 254, in the form of an encapsulated textual description, rather than as an animation, and thus substantially reduces transmission time and memory needed to contain the message.

Server 246 includes a JAVA message generator program 248. The server maintains in its memory JAVA classes 250, including program routines for producing animations, sound, and text, as are known in the art, and assets 252, generally matching the set of assets 244 of source client 240. Message generator 248 converts the source client's message to HTML. Message generator 248 receives the textual description of the animation from source client 240 and uses it to generate an HTML document. Server 246 transmits a URL reference to the HTML document, as is known in the art, in the form of an electronic mail message over network 236 to recipient 254. When recipient 254 opens the message, the HTML document activates a JAVA applet on server 246. The applet causes the animation prepared by source client 240 to be replayed on the recipient's computer screen, thus conveying the animated message. System 239 allows a user of source computer 240 to compose and send an animated message to recipient 254 in a manner analogous to sending an electronic mail letter, without the need to understand or follow the conventions of the JAVA language and HTML files.

Figure 17A:
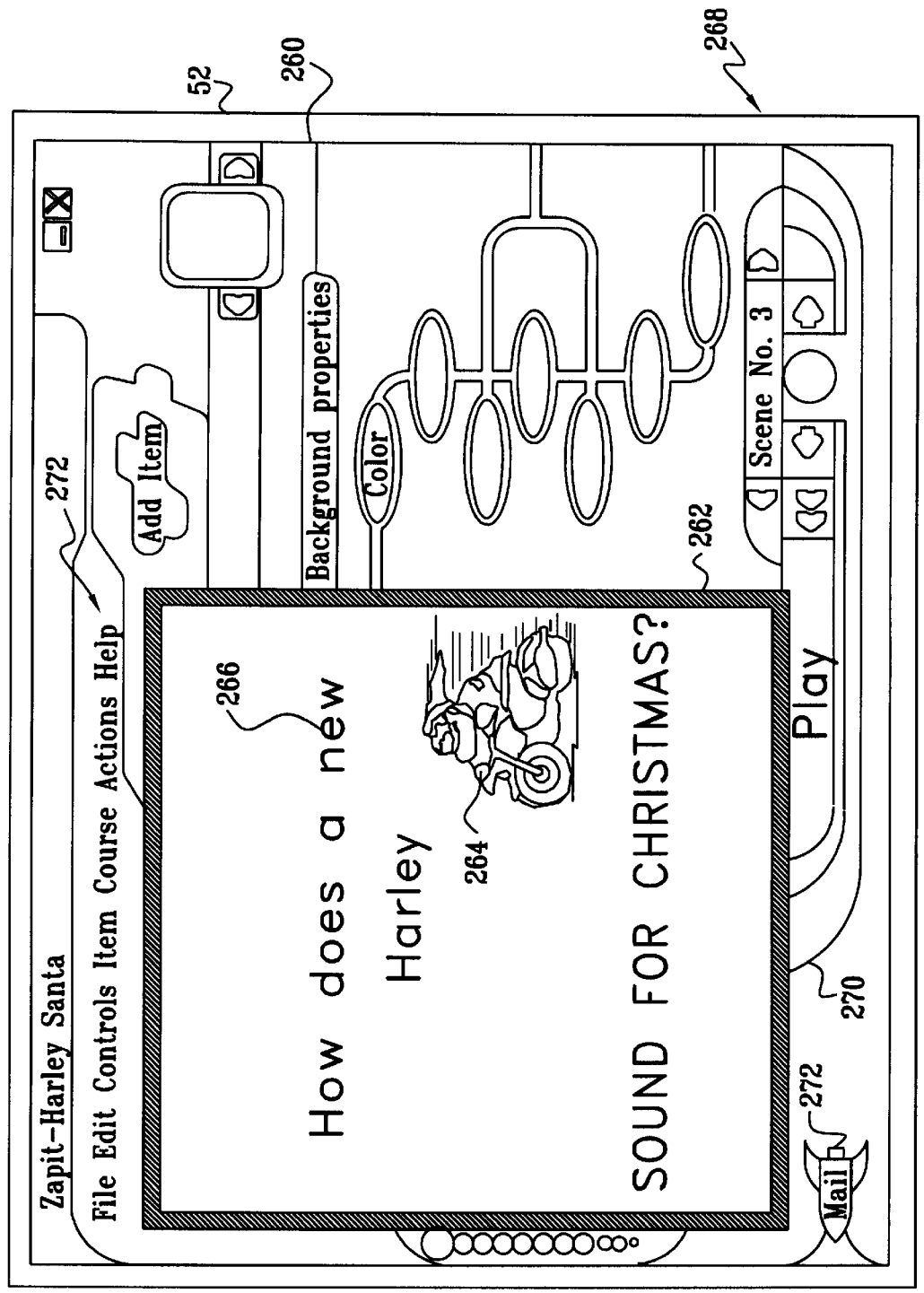
FIG. 17A is a graphic representation of a computer display screen illustrating the preparation of an animated message, in accordance with a preferred embodiment of the present invention.

FIG. 17A is a graphic representation of display 52, illustrating an on-screen window 260 used by editor 242 (FIG. 16) to create an animated message, in accordance with a preferred embodiment of the present invention. Window 260 includes an animation area 262, which displays an animated scene that includes an animated character 264, text 266 and other elements to be included in the message. The window also includes menus 272 and user controls 268, Which are used in producing and editing the message.

Figure 17B:
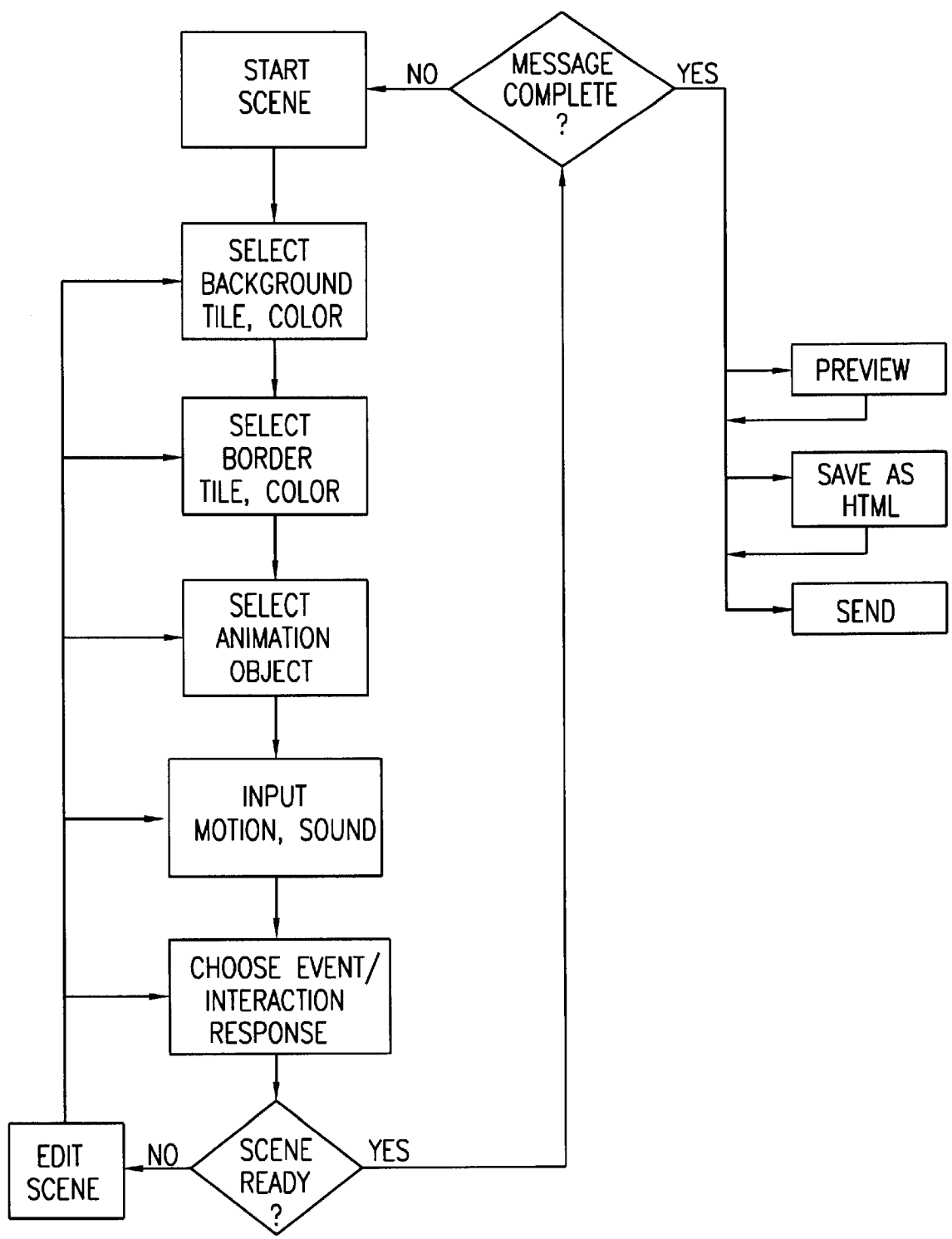
FIG. 17B is a flow chart illustrating a method for preparation of the animated message of FIG. 17A, in accordance with a preferred embodiment of the present invention.

FIG. 17B is a flow chart illustrating a method for creating and editing the message of FIG. 17A, in accordance with a preferred embodiment of the present invention. A user of editor 242 uses menus 272 and user controls 268 to compose the animated scene. The user selects tiles and colors for the background and the border of the scene. Preferably, at least one animation object is selected, such as character 264, along with a message, such as text 266. The background, border and animation object are preferably chosen from among assets 244 using an associative search engine, as described above with reference to FIGS. 13A, 13B and 14. It will be understood, however, that the steps of choosing the background and border are optional, and in the event that the user does not choose a background and/or border, editor 242 provides a default background and border.

The user next inputs characteristics of the motion of the animation object and voice and/or sound effects to be included with the message. Preferably the animation object comprises a Smart Object, and the user needs only to define a path within the scene along which the object is to move. Further preferably, the user may assign to the animation object certain responses to events and user interactions, for example, defining a response of the object that is invoked when a recipient selects the object. In the case of Smart Objects, such responses may be assigned by adding conditional and/or optional animations to the Smart Object, as described above with reference to FIG. 4.

Once the elements of the scene in animation area 262 have been composed, the user may observe and edit the scene and make any desired changes. The user may also add additional scenes, in sequence, so as to create a multi-scene message.

When the animated message is complete, the user may preview the animation using an on-screen control bar 270, shown in FIG. 17A. The message may also be saved to disk as an HTML file. When the message is ready to be sent, the user selects a "mail" button 272, and the textual description of the message is conveyed to server 246, as described above.

Figure 18A:
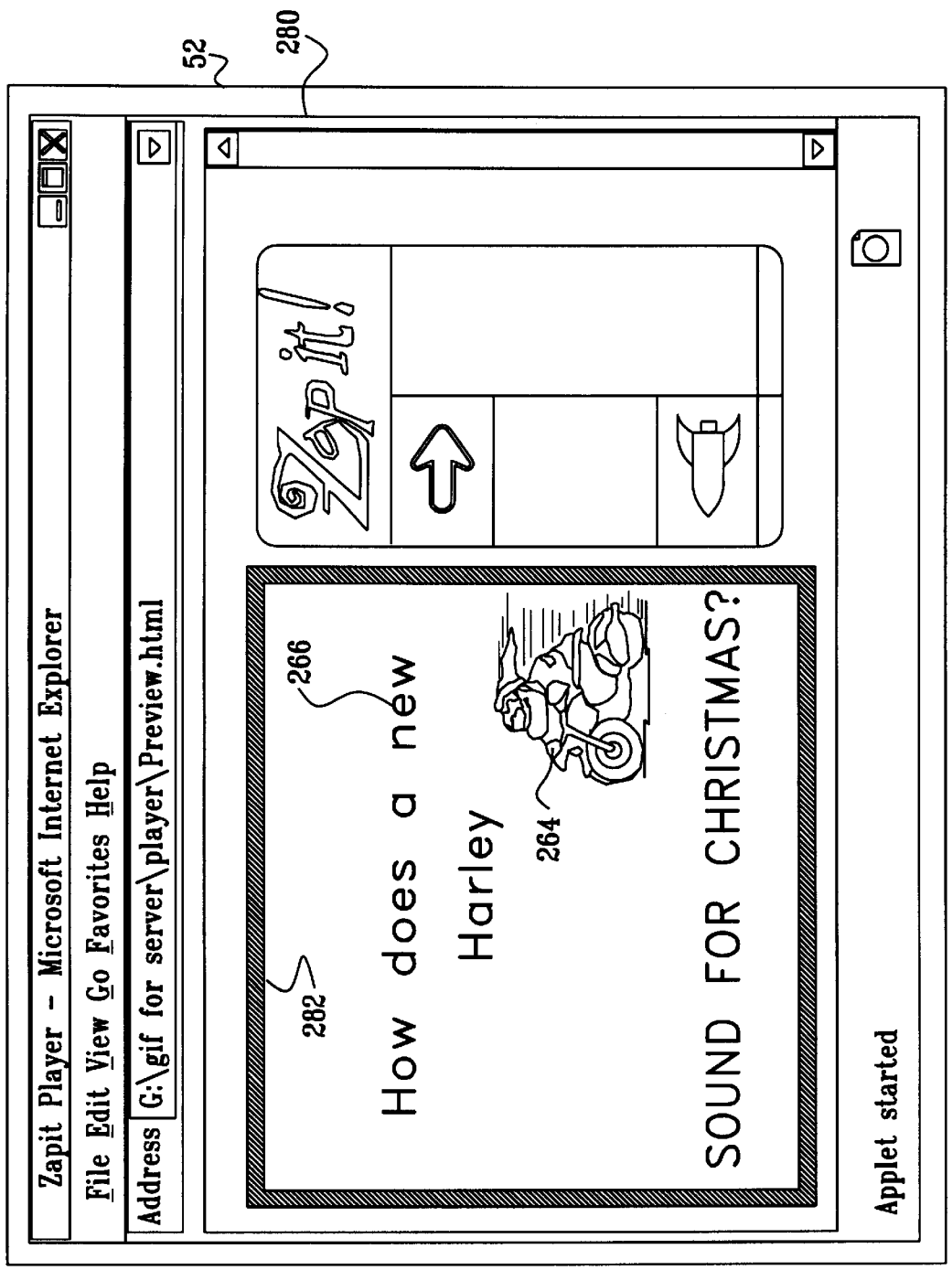
FIG. 18A is a graphic representation of a computer display screen illustrating playback of the animated message of FIG. 17A by a recipient thereof, in accordance with a preferred embodiment of the present invention.

FIG. 18A is a graphic representation of display 52 belonging to recipient 254 (FIG. 16), showing the message conveyed from source client 240, in accordance with a preferred embodiment of the present invention. A window 280 on the screen of display 52 is created by a well-known Internet browser. Animated character 264 and text message 266, as created by the source client, appear within an animation area 282 in window 280.

Figure 18B:
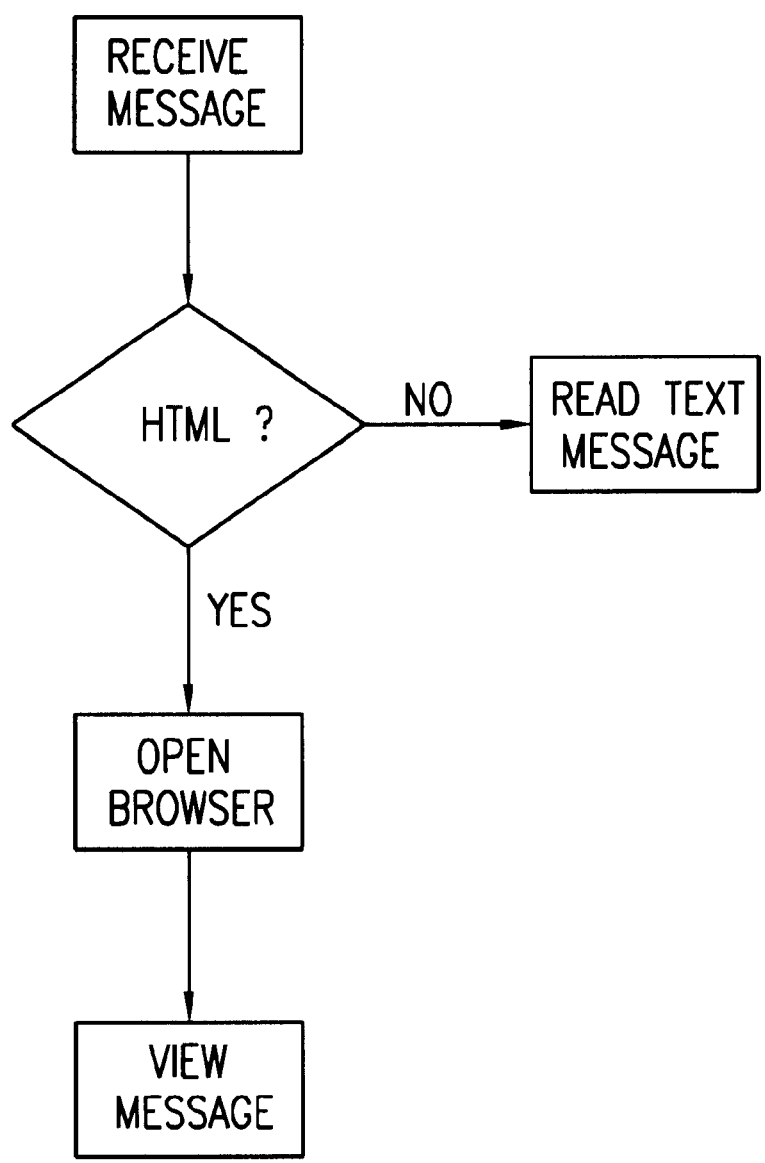
FIG. 18B is a flow chart illustrating a method for playback of the animated message of FIG. 18A, in accordance with a preferred embodiment of the present invention.

FIG. 18B is a flow chart illustrating a method by which the message is presented on display 52, in accordance with a preferred embodiment of the present invention. Recipient 254 receives the electronic mail message conveyed by server 246. When the message is opened, a "hot link" appears in the message, as is known in the art, providing a link to a URL created by server 246 for displaying the animated message created by source client 240. When the hot link is selected, the Internet browser associated with window 280 is opened (if it is not open already), and the animated message is displayed in the window, as shown in FIG. 18A. Alternatively, the recipient user may himself determine that the message contains an HTML file and open the browser to display the animation. When other, non-HTML electronic mail messages are received by recipient 254, they are simply read as text.

Although the animated electronic mail message of FIG. 18A comprises a JAVA applet, which drives an animation that is displayed in a dedicated animation area 282, the principles of the present invention may be employed to encapsulate and send animated messages of other types, as well. For example, a 3D Smart Object may be created in a VRML-compatible format to serve as the animated avatar of a user. This avatar may be incorporated into an mail message sent by the user, so that when recipient opens the message using a VRML-compatible browser, the animated 3D avatar will appear on the recipient's computer display. If desired, the avatar can speak (or even sing) the user's message. The 3D Smart Object is preferably rendered as a Transparent 3D overlay on the browser window, as shown, for example, in FIG. 2.

Software File A comprises a JAVA-based electronic mail and visual search engine, in ZIP-compressed hexadecimal form, in accordance with a preferred embodiment of the present invention. The programs in the file run under the Windows 95 operating system in 16-bit color. To run the programs, the file ZapIt.zip is "unzipped" into the main directory of the hard disk of a computer, and the program setup.exe is then run to install the program. To generate an animated electronic mail message, as described above, the application ZapIT.exe is opened, and the message is generated by following on-screen instructions. By selecting an item in the instructions labeled "Animation/Border/Bkd," the operation of a visual search engine, as described above, may be observed. After the electronic mail message is generated, it may be saved as a HTML file by choosing the "Save as HTML" selection from the File menu. To view the animation, the HTML file is opened using a JAVA-compatible web browser.

It will be appreciated that Smart Objects are particularly well suited for encapsulation and transmission over computer networks. The modularity of Smart Objects allows them to be easily customized, to present a desired animated image, such as an avatar, and/or to convey a message chosen by a user. Furthermore, the substantial autonomy of Smart Objects allows animation files that include Smart Objects to be relatively compact, since beyond the Smart Objects themselves, such files must generally contain only a script, and need not include details of the animation.

It will moreover be appreciated that the preferred embodiments described above are cited by way of example, and the full scope of the invention is limited only by the claims.

SOFTWARE FILES

The following software files are incorporated herein:

Software File A comprises a JAVA-based electronic mail and visual search engine, in ZIP-compressed hexadecimal form, in accordance with a preferred embodiment of the present invention;

Software File B comprises a program in ZIP-compressed hexadecimal form, for creating Transparent 3D overlays in conjunction with Netscape "Navigator," in accordance with a preferred embodiment of the present invention;

Software File C comprises a converter program in ZIP-compressed hexadecimal form, for use in conjunction with "Lightwave 5.0" for creating 3D Smart Objects, in accordance with a preferred embodiment of the present invention; and Software File D comprises a computer animation program using 3D Smart Objects, in ZIP-compressed hexadecimal form, in accordance with a preferred embodiment of the present invention.

These appendices contain material covered by copyright, belonging to Zapa Digital Arts Ltd.

What is claimed is:

1. A method for producing an animation sequence on a graphic display driven by a computer, comprising:

producing a frame image having a non-rectangular transparent area;

generating an animation sequence on the display; and overlaying the frame image on the animation sequence, so that the animation is framed by the transparent area.

2. A method for producing an animation sequence on a graphic display driven by a computer, comprising:

defining a three-dimensional geometrical description of an animation scene;

selecting first and second reference points relative to the scene and defining a geometrical path dependent on the points;

rendering a first image of the scene as seen from a viewpoint at a first position on the geometrical path;

translating the viewpoint to a second position along the geometrical path; and rendering a second image of the scene as seen from the second position, wherein defining the geometrical path comprises defining a path of revolution generally centered at the second reference point and passing through the first reference point.

3. A method for producing an animation sequence on a graphic display driven by a computer, comprising:

defining a three-dimensional geometrical description of an animation scene;

selecting first and second reference points relative to the scene and defining a geometrical path dependent on the points;

rendering a first image of the scene as seen from a viewpoint at a first position on the geometrical path;

translating the viewpoint to a second position along the geometrical path; and rendering a second image of the scene as seen from the second position, wherein selecting the second reference point comprises selecting a point corresponding generally to the position of a character in the scene.

4. A method for producing an animation sequence on a graphic display driven by a computer, comprising:

defining a three-dimensional geometrical description of an animation scene;

selecting first and second reference points relative to the scene and defining a geometrical path dependent on the points;

rendering a first image of the scene as seen from a viewpoint at a first position on the geometrical path;

translating the viewpoint to a second position along the geometrical path; and rendering a second image of the scene as seen from the second position, wherein rendering the first image of the scene as seen from the viewpoint at the first position on the geometrical path comprises rendering the image of the scene as seen from a first viewpoint, and comprising defining a second viewpoint and providing an on-screen control such that when the control is activated, an image of the scene is rendered from the second viewpoint.

5. A system for producing an animation sequence, comprising:

an animation generator, which generates an animation sequence and which produced a frame image having a non-rectangular transparent area, such that the frame image is overlaid on the animation sequence, whereby the animation is framed by the transparent area; and a display, which is driven by the animation generator to display the animation sequence framed by the transparent area.

6. A system for viewing an animation, comprising:

a destination animation generator, coupled to a network, which receives via the network a script defining the animation along with an object comprising a geometrical description of an image element for inclusion in the animation and a characteristic of motion of the element, and renders animated images responsive thereto;

user controls, coupled to the destination animation generator, for controlling rendition of the animated images; and a display, which is driven by the destination animation generator to display the animated images.

7. A system according to claim 6, wherein the user controls comprise on-screen control icons generated by the animation generator on the display.

8. A system according to claim 7, wherein the animated images are contained in a window on the display, and wherein the icons are scaled responsive to a change in scale of the window.

9. A system according to claim 6, wherein the user controls are used to change a viewpoint with respect to which the images are rendered.

* * * * *